(12) United States Patent
Smith et al.

(10) Patent No.: US 11,448,182 B2
(45) Date of Patent: Sep. 20, 2022

(54) RELATING TO WIND TURBINE BLADE MANUFACTURE

(71) Applicant: Vestas Wind Systems A/S, Aarhus N. (DK)

(72) Inventors: Jonathan Smith, Burridge (GB); Andrew Hedges, Surbiton (GB)

(73) Assignee: Vestas Wind Systems A/S, Aarhus N (DK)

( * ) Notice: Subject to any disclaimer, the term of this patent is extended or adjusted under 35 U.S.C. 154(b) by 355 days.

(21) Appl. No.: 16/498,107

(22) PCT Filed: Apr. 4, 2018

(86) PCT No.: PCT/DK2018/050062
§ 371 (c)(1),
(2) Date: Sep. 26, 2019

(87) PCT Pub. No.: WO2018/184644
PCT Pub. Date: Oct. 11, 2018

(65) Prior Publication Data
US 2021/0102523 A1     Apr. 8, 2021

(30) Foreign Application Priority Data

Apr. 5, 2017 (DK) .......................... PA 2017 70247

(51) Int. Cl.
*B32B 41/00* (2006.01)
*F03D 1/06* (2006.01)
(Continued)

(52) U.S. Cl.
CPC ........ *F03D 1/0675* (2013.01); *B29C 65/4835* (2013.01); *B29C 65/7826* (2013.01);
(Continued)

(58) Field of Classification Search
CPC ............... F03D 1/0675; B29C 65/4835; B29C 65/7826; B29C 65/7841; B29C 66/112;
(Continued)

(56) References Cited

U.S. PATENT DOCUMENTS

| 2012/0027613 A1 | 2/2012 | Yarbrough |
| 2015/0316023 A1* | 11/2015 | Sandercock ............ B25B 11/00 |
| | | 416/229 A |
| 2016/0177918 A1 | 6/2016 | Caruso et al. |

FOREIGN PATENT DOCUMENTS

| EP | 2878807 A1 | 6/2015 |
| EP | 3098439 A1 | 11/2016 |

(Continued)

OTHER PUBLICATIONS

China National Intellectual Property Administration, First Notification of Office Action in CN Application No. 201880029479.8, dated Jan. 5, 2021.
(Continued)

*Primary Examiner* — Michael N Orlando
*Assistant Examiner* — Joshel Rivera
(74) *Attorney, Agent, or Firm* — Wood Herron & Evans LLP

(57) ABSTRACT

A method of making a wind turbine blade is described. The wind turbine blade comprises first and second half shells joined together and a shear web bonded between inner surfaces of the respective half shells. The blade is made in a one-stage join up process, which involves supporting the half shells in respective mould halves, and arranging one of the half shells on top of the other half shell with the shear web arranged between the two half shells. Adhesive is provided between the shear web and the inner surfaces of the respective half shells. During the join-up process, the shear web is supported by stabilisers. The use of stabilisers avoids the need for a jig to support the shear web. Stabilisers (Continued)

attached to an inboard end of the shear web may remain accessible after the join-up and can be removed.

18 Claims, 16 Drawing Sheets

(51) Int. Cl.
*B29C 65/48* (2006.01)
*B29C 65/78* (2006.01)
*B29C 65/00* (2006.01)
*B29D 99/00* (2010.01)
B29C 65/02 (2006.01)
B29L 31/08 (2006.01)

(52) U.S. Cl.
CPC ........ *B29C 65/7841* (2013.01); *B29C 66/112* (2013.01); *B29C 66/1312* (2013.01); *B29C 66/636* (2013.01); *B29D 99/0028* (2013.01); B29C 65/02 (2013.01); B29C 66/54 (2013.01); B29L 2031/085 (2013.01)

(58) Field of Classification Search
CPC .............. B29C 66/1312; B29C 66/636; B29C 99/0028; B29C 65/02; B29C 66/54; B29C 66/1142; B29C 66/1162; B29C 66/721; B29C 66/131; B29C 65/48; B29L 2031/085; Y02E 10/72; Y02P 70/50
USPC .................... 156/60, 64, 350, 351, 378, 379
See application file for complete search history.

(56) References Cited

FOREIGN PATENT DOCUMENTS

| WO | 2008089765 A2 | 7/2008 |
|---|---|---|
| WO | 2014094780 A1 | 6/2014 |
| WO | 2017045690 A1 | 3/2017 |

OTHER PUBLICATIONS

European Patent Office, International Search Report and Written Opinion in PCT Application No. PCT/DK2018/050062, dated Jun. 6, 2018.
Danish Patent and Trademark Office, Search and Examination Report in PA 2017 70247, dated Sep. 20, 2017.

* cited by examiner

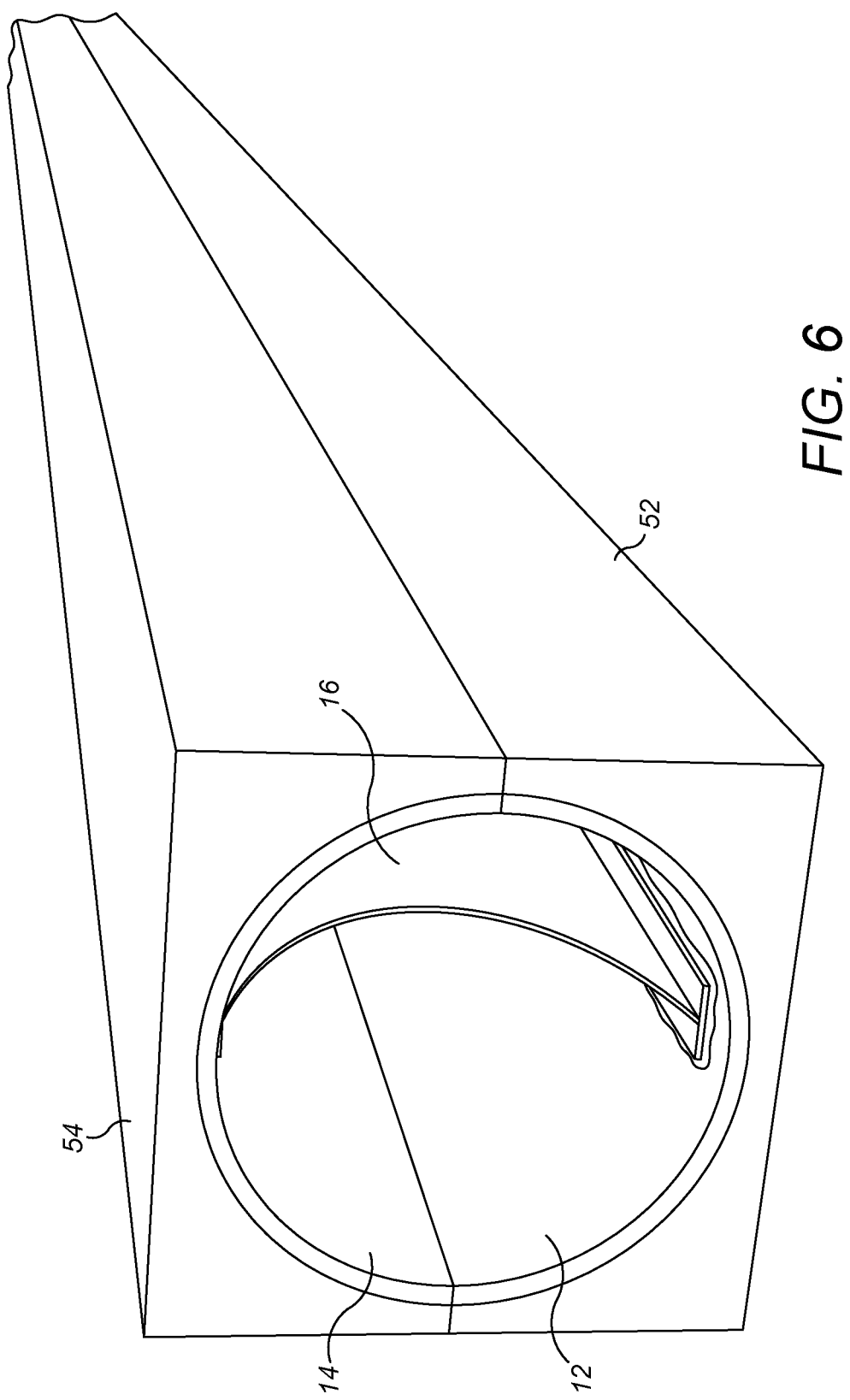

RELATING TO WIND TURBINE BLADE MANUFACTURE

TECHNICAL FIELD

The present invention relates generally to wind turbine blades, and more specifically to methods of making wind turbine blades and apparatus for use in such methods.

BACKGROUND

Modern wind turbine blades typically comprise a hollow shell made up of two half-shells bonded together along leading and trailing edges of the shells. One or more longitudinally-extending shear webs are provided within the internal cavity of the blade. A shear web comprises a web panel disposed between upper and lower mounting flanges. The mounting flanges are bonded respectively to opposed inner surfaces of the two half-shells.

The method of making the blade typically involves forming the two half shells separately from composite materials in respective half-moulds of a blade mould assembly. A two-stage join up process may then be used to connect the half shells together:

In the first stage of the join-up, the shear web(s) are bonded to the inner surface of the first half shell. This stage typically involves depositing adhesive on the inner surface of the first half shell. The shear webs are then lifted into the first half shell and positioned with their lower mounting flanges on top of the adhesive. The adhesive is then allowed to cure before commencing the second stage.

In the second stage of the join-up, adhesive may be applied to the upper mounting flange of the shear web and further adhesive may be applied along leading and trailing edges of the first half shell. The second half shell is then lifted, turned and positioned on top of the first half shell to complete the join-up process.

It is important that the shear webs are supported during the join-up process so that they remain in a fixed (typically vertical) orientation. If the shear webs should move, e.g. tilt, even by a few degrees then this may result in misalignment of the shear web. It can be difficult and costly to rectify any such errors and in some cases the resulting blade may need to be discarded.

For blades having multiple side-by-side shear webs, it is known to connect the shear webs together during the join-up process so that the webs support one another and form a stable structure. An example of this is described in WO2014094780A1. However, this is not possible for blades having a single main web. In such cases a jig may be used to support the single web. The jig comprises a moveable framework that supports the shear web and prevents the shear web from moving relative to the blade shell during the bonding process. The jig also enables precise control over the bond line thickness between the shear web and the blade shell. The jig typically supports the shear web along its entire length, which for modern utility-scale blades is often in excess of 80 metres. Accordingly, the jig is a very large, complicated and expensive item of equipment. These jigs typically extend outside the blade mould and often connect to the mould flanges or the factory floor.

Whilst such jigs work well to support the shear web and produce consistent results, they have several drawbacks. Firstly, such jigs are expensive to produce and purchase. Secondly, the jigs are complex assemblies to install and configure, resulting in long lead times. Thirdly, jigs are bespoke for a particular blade type, and it is generally not possible to use the same jig for different types or sizes of blade. Fourthly, in view of its large size, the jig occupies a significant portion of the floor space in the blade factory, where space is always at a premium.

Against this background, it is an object of the present invention to provide an alternative solution for supporting a shear web, which does not suffer from one or more of the above drawbacks of jigs.

SUMMARY OF THE INVENTION

According to a first aspect of the present invention, there is provided a method of making a wind turbine blade, the method comprising: providing first and second half shells of the blade, each half shell extending in a spanwise direction between a root end and a tip end and extending in a chordwise direction between a leading edge and a trailing edge; providing a longitudinally-extending shear web comprising a web panel disposed between first and second mounting flanges; providing adhesive between the first mounting flange of the shear web and the inner surface of the first half shell; providing adhesive between the second mounting flange of the shear web and the inner surface of the second half shell; joining the parts together in a one-stage join up process comprising arranging the second half shell on top of the first half shell and joining the half shells together whilst simultaneously bonding the shear web to the first and second half shells; wherein the method further comprises supporting the shear web relative to the first half shell during the one-stage join up process by means of a plurality of stabilisers attached to the shear web, wherein each stabiliser extends from the shear web and has a foot arranged in contact with the inner surface of the half shell at a location spaced in the chordwise direction from the shear web.

The first and second half shells may be supported in respective first and second half mould halves of a blade mould assembly. The first half shell may be supported in a cavity of the first mould half. The second half shell may be supported in a cavity of the second mould half. The second mould half may be arranged on top of the first mould half during the join-up process. The first and second mould halves define a longitudinally-extending mould cavity therebetween. The stabilisers may not extend outside this mould cavity. In particular, the stabilisers may not extend outside longitudinal edges of the mould cavity.

The method may comprise compressing the feet of the stabilisers. The feet may be compressed under the weight of the second half shell, and optionally the second half mould, acting on the shear web during the one-stage join up process.

The feet are preferably made from foam, for example neoprene. In particular embodiments, the feet may comprise foam pads.

The method may comprise setting or adjusting a position of the feet of the stabilisers so that the shear web is supported in a substantially vertical orientation. For example, the feet may be extended or retracted relative to a body of the stabiliser.

The stabilisers may only be attached to an inboard portion of the shear web that remains accessible inside the blade following the join-up process.

The method may comprise removing the stabilisers from the shear web after the one-stage join up process.

The method may comprise supporting the shear web during the join-up process by means of a plurality of further stabilisers. The further stabilisers may be attached to an outboard portion of the shear web. The outboard portion may not be accessible inside the blade following the join-up process. The further stabilisers may not be removed following the join-up process. The further stabilisers may remain permanently attached to the shear web.

The method may further comprise bonding a plurality of tabs between the first mounting flange and the inner surface of the first half shell prior to the join-up process. The tabs may be in the form of strips, for example strips of CFRP or GFRP. The method may comprise bonding the tabs using a rapid-cure adhesive that cures more quickly than the adhesive providing between the first mounting flange of the shear web and the inner surface of the first half shell.

The method may comprise supporting the shear web by means of temporary stabilisers whilst bonding the plurality of tabs. The method may further comprise removing the temporary stabilisers from the shear web prior to the join-up process.

The method may comprise attaching a plurality of web foot locators to the inner surface of the first and/or second half shell. The web foot locators may be configured to receive a mounting flange of the shear web. The web foot locators may be bonded to the inner surface of the first and/or second half shell. The web foot locators may define the precise position for the shear web relative to the blade shell(s). Laser-projection may be used to define the required positions for the web foot locators on the blade shell(s).

The web foot locators may be configured to form an interlock with the mounting flange. For example, the web foot locators may form a snap fit with a mounting flange. The web foot locators may be configured to allow vertical movement of the shear web within the web-foot locator.

The method may comprise providing a plurality of bond spacers between the first mounting flange and the inner surface of the first half shell and/or between the second mounting flange and the inner surface of the second half shell. The method may further comprise compressing the bond spacers during the join-up process such that they undergo plastic deformation.

The bond spacers may comprise blocks, for example blocks of foam. Preferably the bond spacers are made from polyethylene terephthalate (PET).

The method may comprise attaching a plurality of flange extenders to the first and/or second mounting flange of the shear web. The flange extenders may be configured to locate the shear web in a respective plurality of web foot locators attached to the inner surface of the first and/or second half shells.

The method may comprise bonding the first and second half shells together. To this end, the method may comprise providing adhesive to the leading and trailing edges of the first and/or second half shell.

According to a second aspect of the present invention, there is provided a wind turbine blade comprising: first and second half shells joined together and defining an internal cavity between mutually opposed inner surfaces of the first and second half shells; a longitudinally-extending shear web arranged in the internal cavity, the shear web having a web panel disposed between first and second mounting flanges, the first mounting flange being bonded to the inner surface of the first half shell and the second mounting flange being bonded to the inner surface of the second half shell; and a plurality of stabilisers attached to the shear web, wherein each stabiliser extends from the shear web and has a foot arranged in contact with the inner surface of the half shell at a location spaced in the chordwise direction from the shear web.

The stabilisers may be permanently attached to the shear web. The stabilisers may be permanently attached to an outboard portion of the shear web that is inaccessible within the internal cavity of the blade. Accordingly, it may not be possible to remove these stabilisers after the blade is manufactured. The permanently attached stabilisers may therefore remain inside the blade during the service lift of the blade.

Additionally or alternatively, the blade may comprise removable stabilisers. The removable stabilisers may be attached to an inboard portion of the shear web. The inboard portion may be accessible within the internal cavity of the blade. Accordingly, these stabilisers may be detached from the shear web and removed from inside the blade after the blade is manufactured.

The blade may comprise a plurality of tabs bonded between the first mounting flange and the inner surface of the first half shell. The tabs may be as already described above, with reference to the method.

The wind turbine blade may further comprise a plurality of plastically-deformed bond spacers between the first mounting flange and the inner surface of the first half shell and/or between the first mounting flange and the inner surface of the second half shell.

The wind turbine blade preferably comprises a single main shear web. The shear web may form part of a primary load bearing spar structure. The wind turbine blade may comprise one or more secondary shear webs, for example a secondary shear web disposed near a trailing edge of the blade.

Optional features described or claimed in relation to the first aspect of the invention apply equally to the second aspect of the invention and vice versa. Repetition of such features in the description and in the claims is avoided for reasons of conciseness.

BRIEF DESCRIPTION OF THE DRAWINGS

The invention will now be described by way of non-limiting example with reference to the accompanying figures, in which:

FIG. 6 shows the second mould half and second half shell positioned on top of the first mould half and first half shell in order to join the various parts of the blade together;

DETAILED DESCRIPTION

Figure 1:
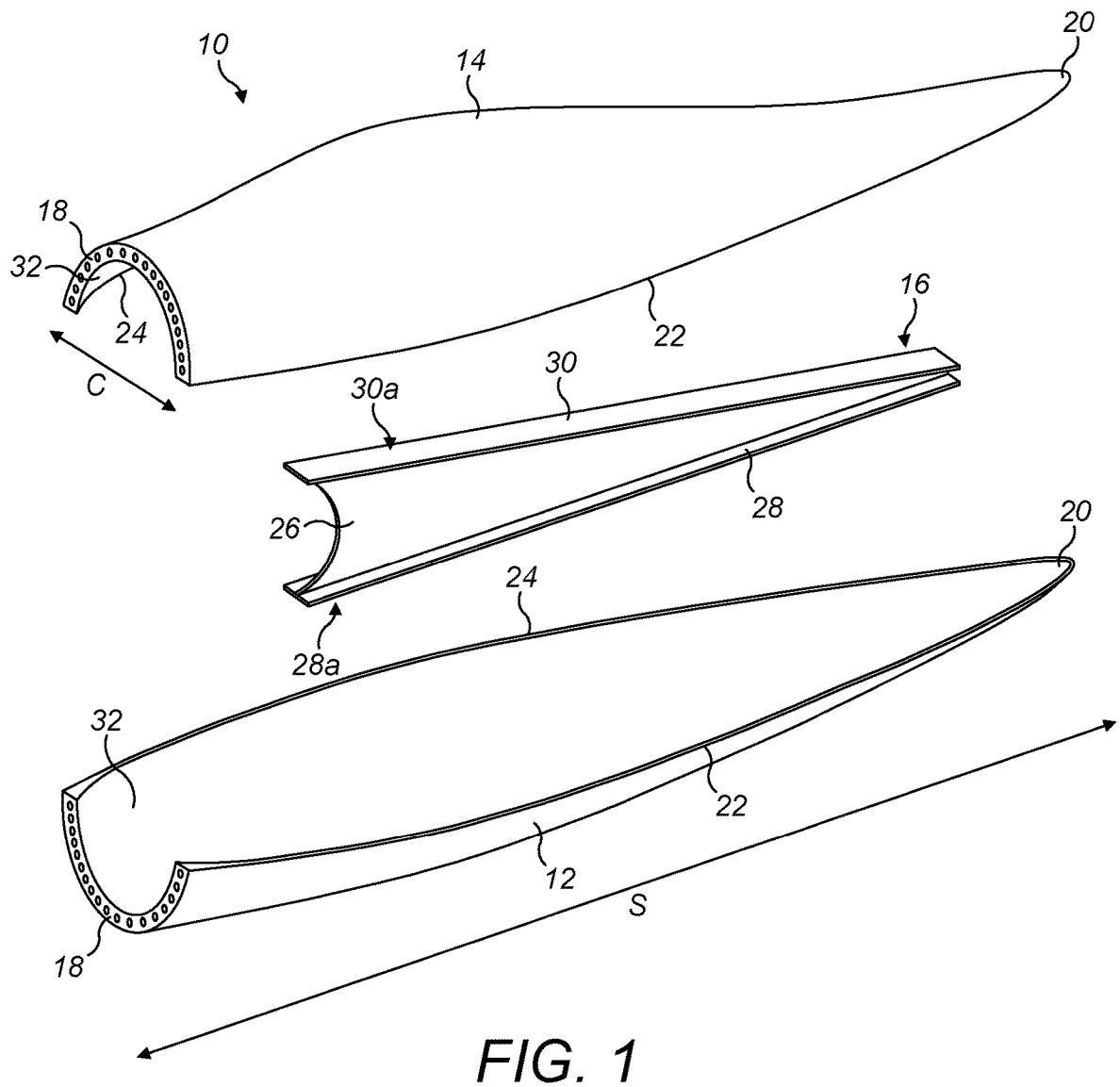
FIG. 1 is an exploded view a wind turbine blade, showing first and second half shells and a shear web.

In the following description, the same reference numerals will be used for equivalent features across all embodiments.

FIG. 1 is an exploded view of a wind turbine blade 10. The blade 10 comprises an outer shell formed of first and second half shells 12, 14, e.g. a windward half shell and a leeward half shell, and a single shear web 16. The half shells 12, 14 each extend from a root end 18 to a tip end 20 in a spanwise direction, S, and extend between a leading edge 22 and a trailing edge 24 in a chordwise direction, C.

The shear web 16 is a longitudinally-extending structure, which in the illustrated example comprises a web panel 26 disposed between first and second mounting flanges 28, 30. In the orientation of the shear web 16 shown in the figures, the first mounting flange 28 is a 'lower' mounting flange, and the second mounting flange 30 is an 'upper' mounting flange. The mounting flanges 28, 30 are arranged transversely to the web-panel 26 and each flange 28, 30 has an outer 'mounting' surface 28a, 30a for bonding to an inner surface 32, 34 of a respective half shell 12, 14.

In this example, the shear web 16 is substantially I-shaped in cross-section. In other embodiments, the shear web 16 may have a different shape, e.g. C-shaped. Also, in this example, the shear web 16 tapers in height progressively moving from a root end to a tip end, corresponding to the tapering thickness of the blade 10 towards the tip 20.

The various parts of the blade 10 are typically made from composite materials, for example glass-fibre reinforced plastic (GFRP) and/or carbon-fibre reinforced plastic (CFRP). The blade shells 12, 14 are formed in separate half moulds of a blade mould assembly, whilst the shear web 16 is generally formed in a dedicated shear web mould tool. Once the various parts have been formed, they are then joined together in a join-up process to form the completed blade 10. This typically involves bonding the first and second half shells 12, 14 together with the shear web 16 inside the blade 10 bonded to the respective inner surfaces 32, 34 of the half shells 12, 14.

Figure 2:
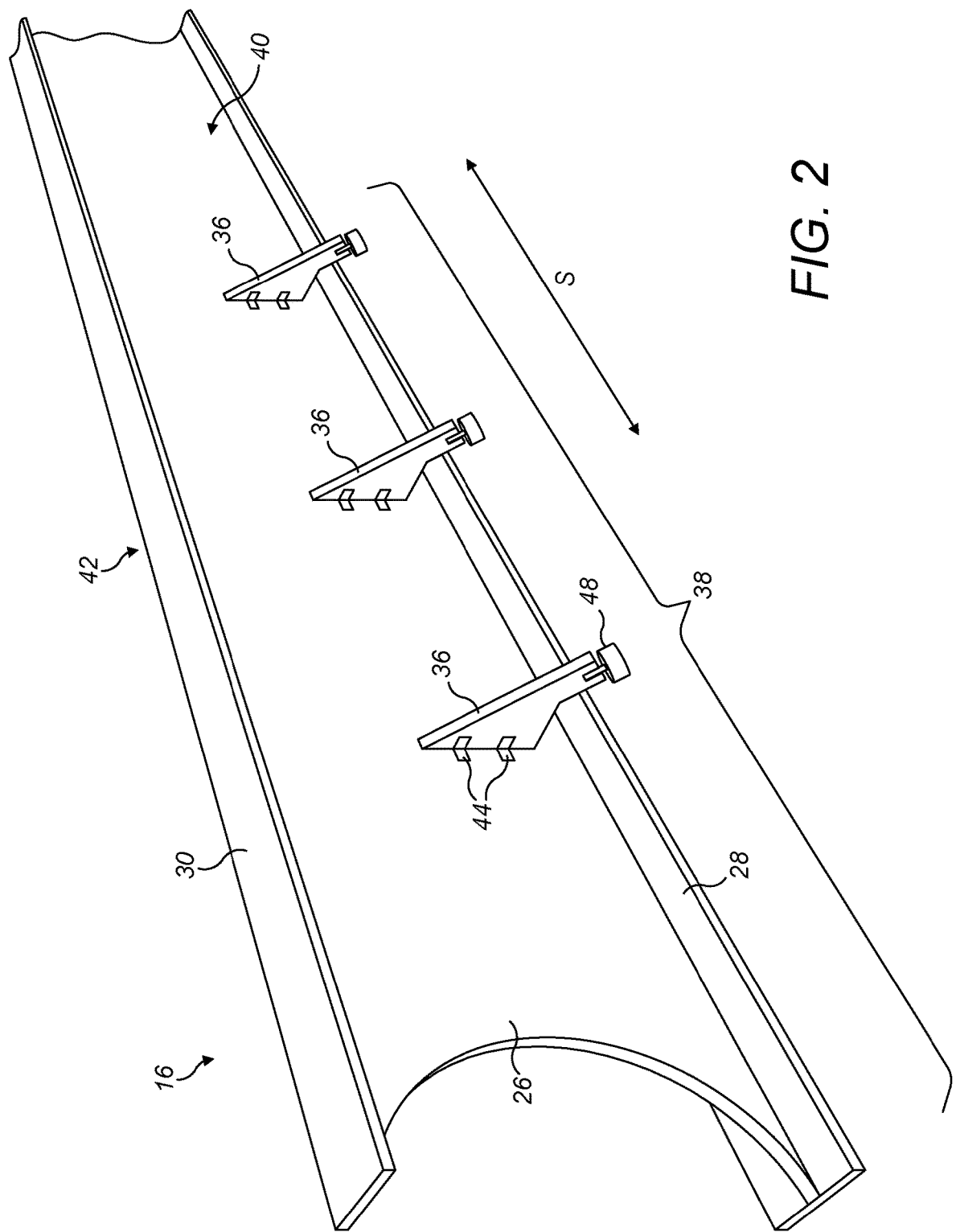
FIG. 2 is a perspective view of an inboard end of the shear web fitted with a plurality of removable stabilisers in accordance with an aspect of the invention.

Referring to FIG. 2, this shows a shear web 16 in isolation, prior to its integration with the blade shells 12, 14 (shown in FIG. 1) to form a wind turbine blade 10. In accordance with an aspect of the invention, a plurality of stabilisers 36 are attached to an inboard portion 38 of the shear web 16. The stabilisers 36 are configured to support the shear web 16 so that the shear web 16 remains upright (e.g. substantially vertical) and maintains its position relative to the blade shells 12, 14 (shown in FIG. 1) during the join-up process. The stabilisers 36 prevent the shear web 16 from toppling over or otherwise moving relative to the blade shells 12, 14, e.g. tilting, during the blade join-up process.

In this example, three stabilisers 36 are shown attached to a first side 40 of the web-panel 26, and a further three stabilisers (not visible in FIG. 2) are attached to a second side 56 of the web-panel 26. In other examples, any suitable number of stabilisers 36 may be used. The stabilisers 36 project outwardly from the web-panel 26 of the shear web 16 in a direction perpendicular to the length of the shear web 16. Each stabiliser 36 is preferably arranged in a plane that is generally perpendicular to the plane of the web panel 26. The stabilisers 36 on one side of the web panel 26 may be aligned (in the spanwise direction, S) with the stabilisers 36 on the other side of the panel 26. Alternatively the stabilisers 36 may be longitudinally offset from one another, e.g. in staggered relation in the spanwise direction S.

Each stabiliser 36 comprises attachment means 44 for attaching to the web panel 26, and a foot 48 arranged to make contact with an inner surface 32 (shown in FIG. 1) of the blade shell 12. In this example, each stabiliser 36 is attached to the web panel 26 by means of brackets 44, which are screwed to both the stabiliser 36 and the web-panel 26. Other suitable attachments means 44 may be used in other embodiments, for example the stabilisers 36 may be bolted or bonded to the web panel 26.

The form and function of the stabilisers 36 will be described in further detail later with reference to FIGS. 7a and 7b, following a brief discussion of the basic blade join-up process.

Figure 3:
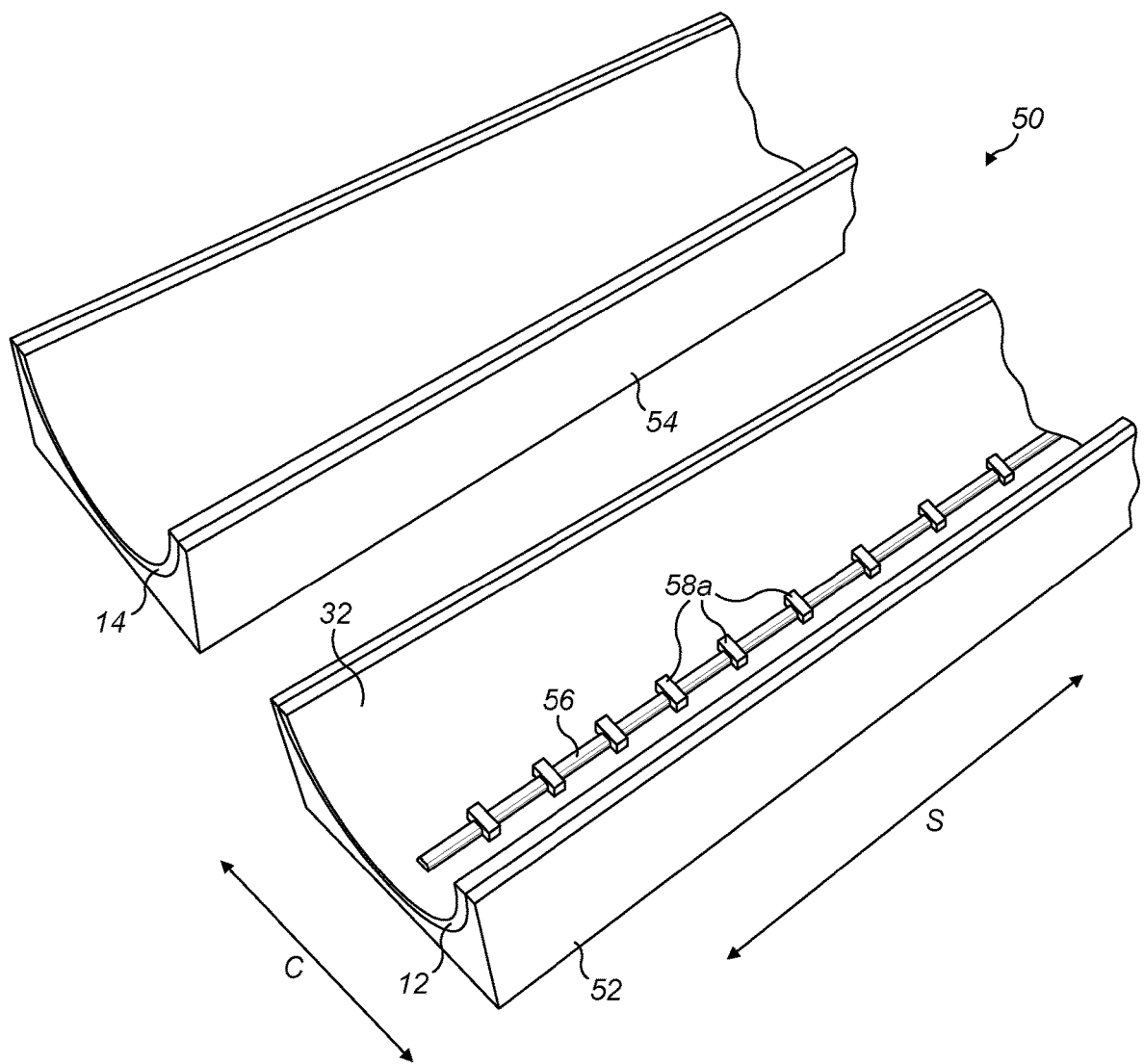
FIG. 3 shows the first and second half shells supported in respective first and second mould halves and a line of adhesive deposited on an inner surface of the first half shell; a plurality of bond spacers are also shown in the line of adhesive.

Referring to FIG. 3, this shows a blade mould assembly 50 comprising first and second mould halves 52, 54 arranged side-by-side. As shown, the mould halves 52, 54 have already been used to form the two halves of the blade shell. Accordingly, the first mould half 52 is shown supporting a first half shell 12, whilst the second mould half 54 is supporting a second half shell 14.

Prior to the join-up, a bead of adhesive 56 may be deposited on the inner surface 32 of the first half shell 12. The adhesive 56 will be used to bond the shear web 16 (shown in FIG. 1) to the first half shell 12. The adhesive 56 may be deposited in a straight line, which extends along a majority of the length of the blade shell 12. The length of the adhesive bead 56 corresponds generally to the length of the shear web 16. In other embodiments, the adhesive 56 could be applied directly to the lower mounting flange of the shear web 16.

Optionally, a plurality of first (in this case 'lower') bond spacers 58a may be positioned in the adhesive 56, for example at spaced-apart intervals along the bead of adhesive 56. The bond spacers 58a are preferably made from foam. The form and function of the bond spacers 58a will be discussed in detail later with reference to FIGS. 15 and 16a to 16d.

Figure 4:
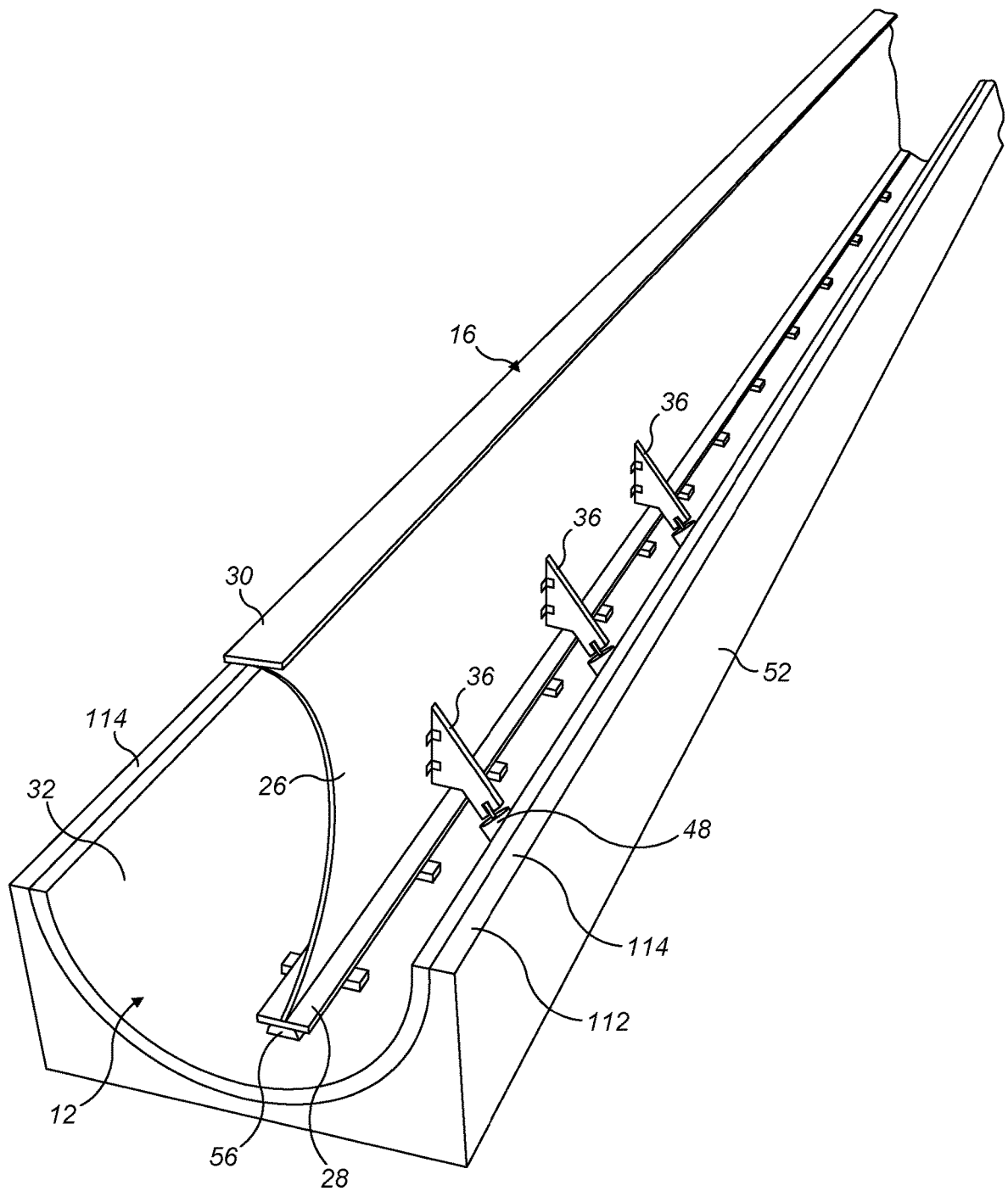
FIG. 4 shows the shear web positioned in the first half shell on top of the line of adhesive shown in FIG. 2, and supported by the removable stabilisers.

Referring to FIG. 4, the shear web 16 is positioned on top of the adhesive 56 deposited in the previous stage. In this example, the shear web 16 is lifted into the first half shell 12 and lowered until its lower mounting flange 28 sits on top of the bead of adhesive 56. At this point, the feet 48 of the stabilisers 36 on each side of the web panel 26 bear against the curved inner surface 32 of the first half shell 12 and stabilise the shear web 16, preventing it from toppling over and preventing the shear web 16 from tilting or otherwise moving relative to the blade shells 12, 14 once in the correct position.

Figure 5:
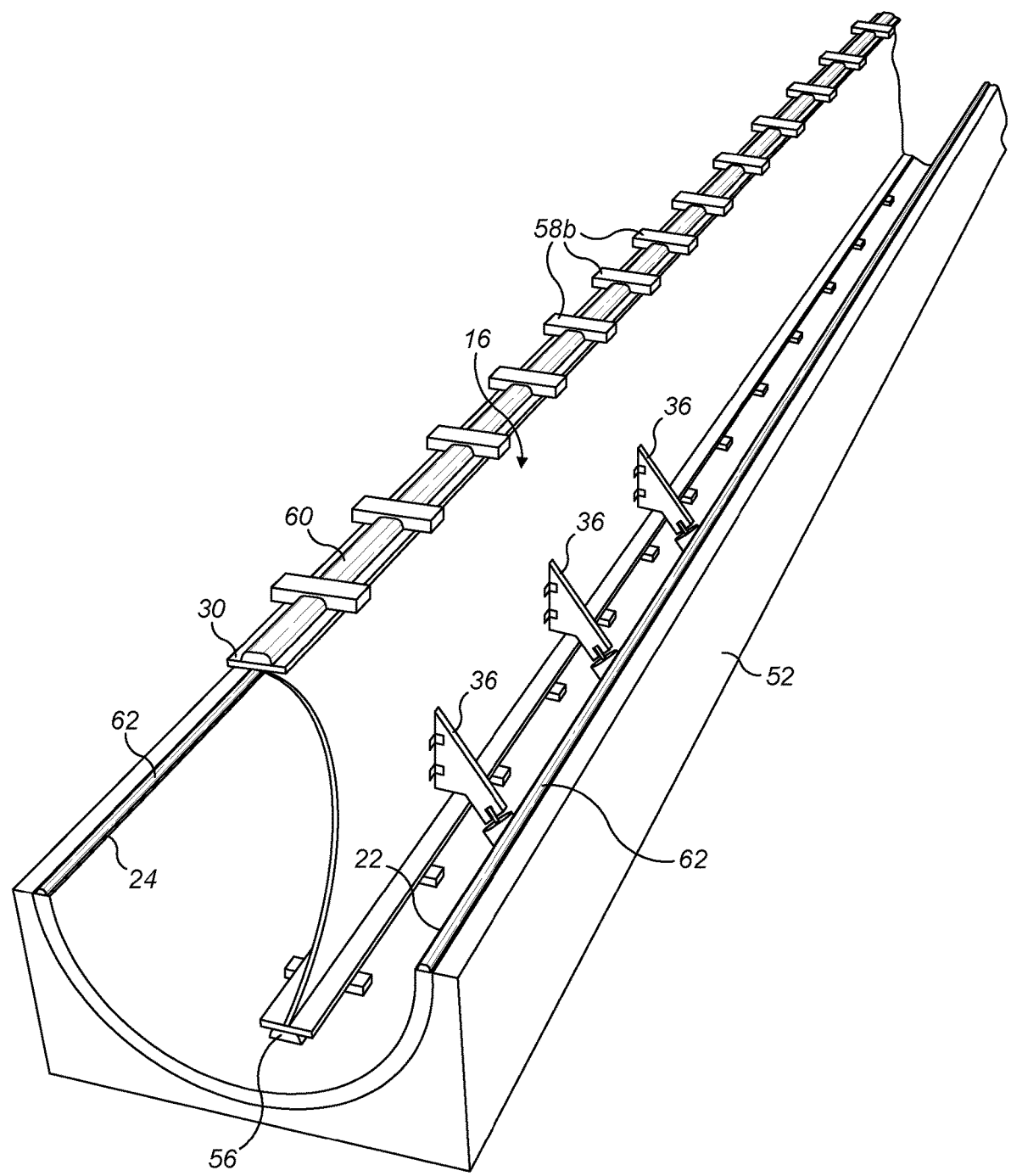
FIG. 5 shows further adhesive applied to an upper mounting flange of the shear web and to leading and trailing edges of the first half shell; bond spacers are also shown on the upper mounting flange.

Referring now to FIG. 5, a bead of adhesive 60 is applied to the upper mounting flange 30 of the shear web 16 and further adhesive 62 is applied along the leading and trailing edges 22, 24 of the first half shell 12.

Optionally, a plurality of second (in this case 'upper') bond spacers 58b may be positioned in the adhesive 60, for example at spaced apart intervals along the bead of adhesive 60. The second bond spacers 58b are preferably substantially identical to the first bond spacers 58a shown in FIG. 4, and will be discussed in detail later with reference to FIGS. 15 and 16a to 16d.

Referring now to FIG. 6, the join-up process involves bonding the various parts together, i.e. bonding the two half shells 12, 14 together, and bonding the shear web 16 between the two half shells 12, 14. In this example, the process involves positioning the second half shell 14 on top of the first half shell 12. This is achieved by lifting and turning the second mould half 54 and placing it on top of the first mould half 52—this process is referred to as 'closing the mould'.

The join-up process described in relation to FIGS. 3 to 6 is a one-stage join-up. In the one-stage join up, the shear web 16 is bonded to both half shells 12, 14 simultaneously. This is in contrast to the two-stage join-up described by way of background, where the shear web 16 is first bonded to one half shell 12, and only after the adhesive is cured is the second half shell 14 positioned on top of the first half shell 12 for the second stage of the join up. A one-stage join up is not possible when a jig is used to stabilise the shear web 16, because the jig must be removed from the shear web 16 before the mould can be closed. The use of stabilisers 36 enables a one-stage join-up to be used, which is advantageously quicker than a two-stage join up because all of the adhesive 56, 60, 62 may be cured simultaneously.

The form and function of the stabilisers 36 during the join-up process will now be described further with reference to the schematic cross-sectional views of FIGS. 7a and 7b.

Figure 7A:
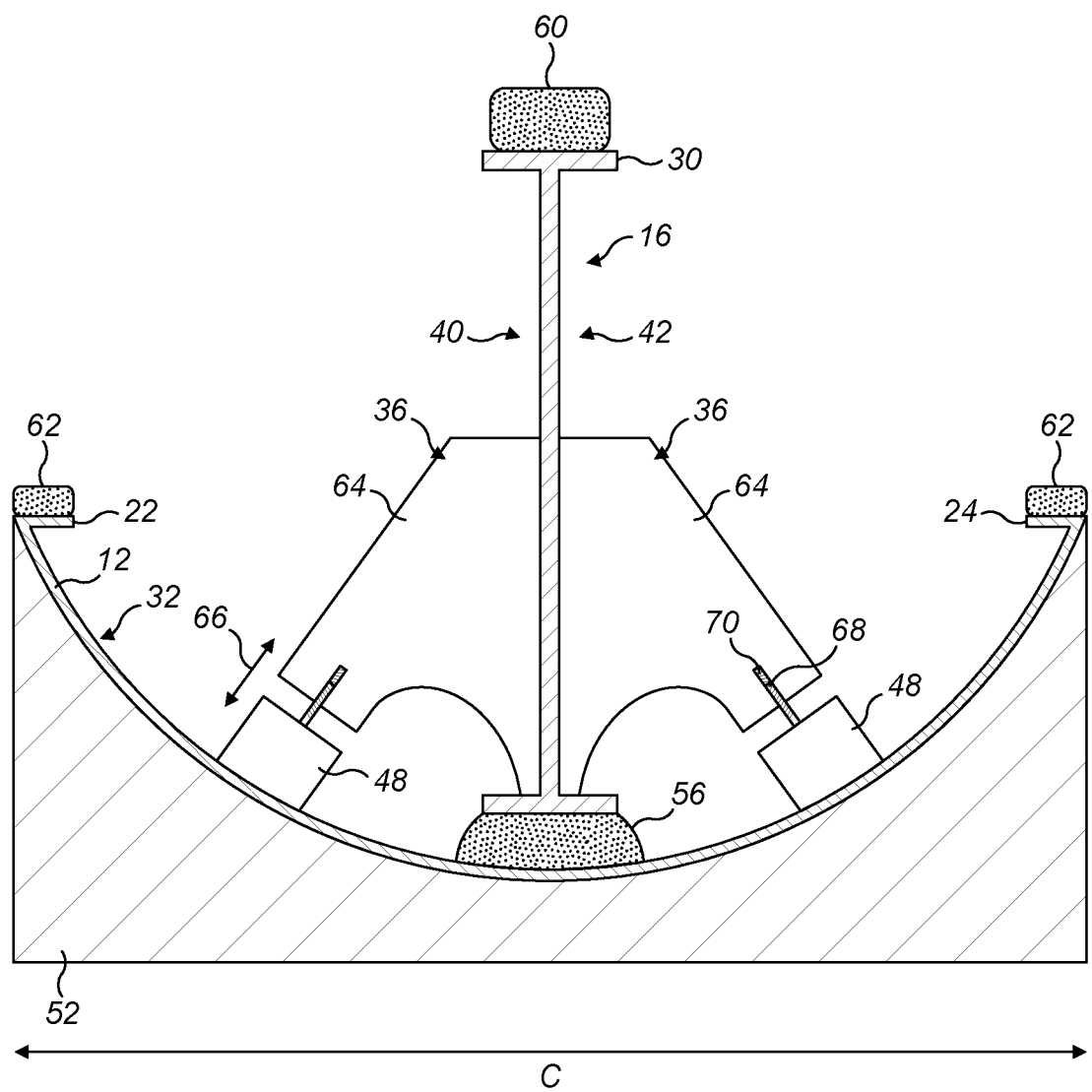
FIG. 7a is a schematic cross-sectional view showing the shear web supported by the removable stabilisers prior to joining the first and second half shells together.

FIG. 7a is a schematic cross-sectional view showing the first half shell 12 supported in the first half mould 52. The shear web 16 is arranged inside the first half shell 12 and positioned on top of the bead of adhesive 56. Adhesive 60 is also shown on the upper mounting flange 30 of the shear web 16 and further adhesive 62 is shown on leading and trailing edge flanges 22, 24 of the first half shell 12. It will be appreciated FIG. 7a shows the same stage of the join-up process as shown in FIG. 5.

The shear web 16 is supported by the stabilisers 36, which maintain the shear web 16 in the correct position and prevent it from tilting or leaning. The feet 48 of the stabilisers 36 are each spaced apart from the shear web 16 in the chordwise direction, C. The feet 48 rest against the curved inner surface 32 of the first half shell 12 to provide support for the shear web 16. In this example the feet 48 rest against the curved inner surface 32 of the first half shell 12 on both sides 40, 42 of the shear web 16. However, if stabilisers are only provided on a single side of the shear web 16 then the feet would only rest on one side of the shear web.

The feet 48 are preferably adjustable. In this example, the feet 48 are extendable relative to the body 64 of the stabiliser 36. This allows the feet 48 to be moved slightly towards or away from the surface of the half shell 12, in the direction of the double-headed arrow 66 in FIG. 7a. This adjustability enables the angle of the shear web 16 to be fine tuned prior to the join-up process. For example, if the shear web 16 is leaning to one side slightly, then the feet 48 of the stabilisers 36 on each side of the shear web 16 may be adjusted accordingly (e.g. extended or retracted slightly) to move the shear web 16 into a vertical orientation.

The adjustability of the feet 48 may be provided by any suitable coupling between the feet 48 and the body 64 of the stabilisers 36. In this example, each foot 48 is provided at an end of a threaded shaft 68, which is received within a threaded bore 70 in the body 64 of the stabiliser 36. Turning the feet 48 relative to the stabiliser body 64 causes the feet 48 to extend or retract in the direction of arrow 66.

The feet 48 are preferably made from a compressible material such as foam. In this example, the feet 48 comprise foam pads formed from Neoprene, although other suitable compressible materials may be used. The feet 48 are intended to compress during the join-up process, as shown in FIG. 7b. In another example, the feet 48 may be in the form of a spring which compresses during the join-up process.

Figure 7B:
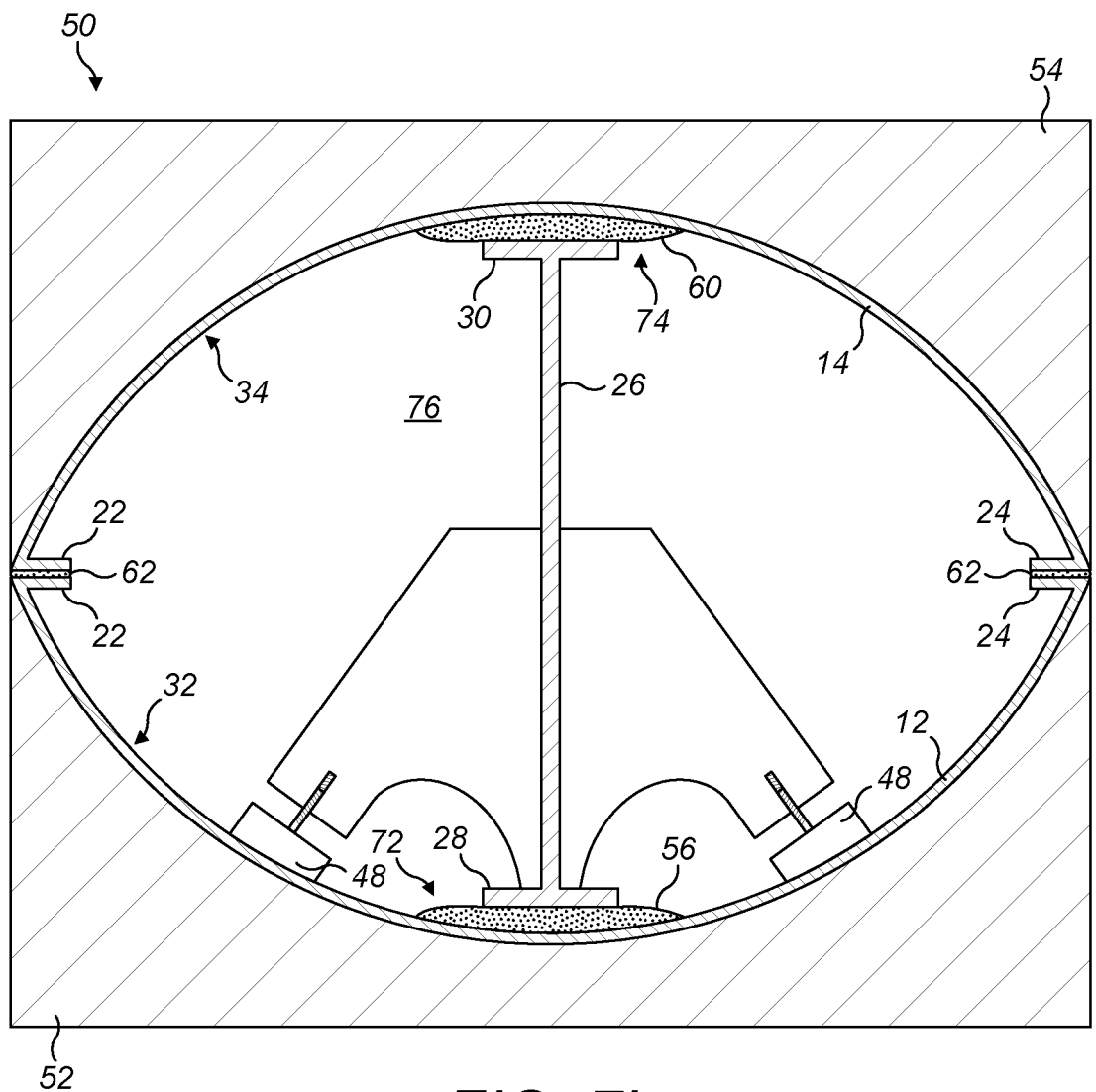
FIG. 7b is a schematic cross-sectional view showing the first and second half shells being bonded together.

Referring to FIG. 7b, this shows the same stage of the join-up process as shown in FIG. 6, i.e. when the mould 50 is closed and the second half shell 14 is positioned on top of the first half shell 12. With the mould 50 closed, the adhesive 56, 60, 62 between the various components is compressed under the weight of the second half shell 14 and the second mould half 54. Specifically, the adhesive 56 deposited on the first half shell 12 is squeezed between the inner surface 32 of the first half shell 12 and the lower mounting flange 28 of the shear web 16; the adhesive 60 applied to the upper mounting flange 30 of the shear web 16 is squeezed between the inner surface 34 of the second half shell 14 and the upper mounting flange 30 of the shear web 16; and the adhesive 62 applied to the leading and trailing edges 22, 24 of the first half shell 12 is squeezed against the corresponding leading and trailing edges 22, 24 of the second half shell 14.

The stabilisers 36 are configured to allow the shear web 16 to move vertically during the join-up process, in particular a small vertical movement. This is to ensure adequate compression of the adhesive 56, 60 in the bond lines 72, 74 between the shear web 16 and half shells 12, 14. As mentioned previously, the feet 48 of the stabilisers 36 are compressible. As can be seen in FIG. 7b, the feet 48 become compressed during the join-up process to allow the shear web 16 to be forced downwards towards the first half shell 12.

Once the adhesive 56, 60, 62 has cured, the completed blade can be removed from the mould assembly 50 ('demoulded). The stabilisers 36 may also be removed from the shear web 16. To remove the stabilisers 36, an operator may enter the internal cavity 76 of the blade 10 through the open root end 18 (see FIG. 1) to gain access to the stabilisers 36. The operator may then detach and remove the stabilisers 36 e.g. by unscrewing the stabilisers 36 from the web panel 26.

It will be appreciated that due to the tapering thickness of the blade 10 towards the tip (see FIG. 1), it is not possible to access the internal cavity 76 of the blade 10 all the way to the tip 20 (shown in FIG. 1) as the space inside the blade 10 becomes too restricted. In accordance with a preferred embodiment of the invention, the removable stabilisers 36 may only be provided on the inboard portion 38 of the shear web 16 (shown in FIG. 2). The inboard portion 38 of the shear web 16 is defined herein as the part of the shear web 16 that remains accessible to personnel following the join-up process. Accordingly, any stabilisers 36 provided on this inboard portion 38 of the shear web 16 can be accessed and removed by personnel entering inside the blade 10 following the join-up process.

Preferably removable stabilisers 36 are provided only on an inboard portion 38 of the shear web 16 comprising approximately 35% of the length of the shear web 16. More preferably, the inboard portion 38 comprises approximately 25% of the length of the shear web 16. Most preferably, the inboard portion 38 comprises approximately 20% of the length of the shear web 16.

It has been found that stabilisers 36 provided only on an inboard portion 38 of the shear web 16 can be sufficient to stabilise the entire shear web 16 during the join up process. The lower mounting flange 28 of the shear web 16 may in some cases provide some inherent stability to the shear web 16, particularly towards the tip end of the shear web 16 where the shear web 16 is relatively short, due to its taper (see FIG. 1).

In a particular trial, removable stabilisers 36 were fitted to a shear web 16 having a length of approximately 62 metres. The shear web 16 was designed for a blade having a length of approximately 67 metres. Stabilisers 36 were fitted to the shear web 16 only within the innermost 13 metres of the shear web 16, measured from the root end, i.e. within approximately the first 20% of the length of the shear web 16. The stabilisers 36 were configured substantially as shown in FIG. 2. It was found that the stabilisers 36 were able to stabilise the entire length of the shear web 16 during the join-up. The stabilisers 36 were also all able to be removed following the join up because the first thirteen metres of the shear web 16 remained accessible following join-up, within health-and-safety constraints.

Whilst a one-stage join up is advantageous, it is technically more challenging than a two stage process, since there is greater scope for the shear web 16 to move once the mould 50 is closed, and it is not possible to detect or rectify any such movement in a one-stage process. It is therefore important to ensure precise positioning of the shear web 16 and accurate alignment of the shear web 16 relative to the blade shells 12, 14 during the join up process. Whilst the removable stabilisers 36 described above work well to prevent movement, additional measures may be taken in some cases to improve the initial alignment of the shear web 16 and/or to enhance the stability of the shear web 16 during the join-up process. These additional measures will now be described with reference to FIGS. 8 to 14.

Figure 8:
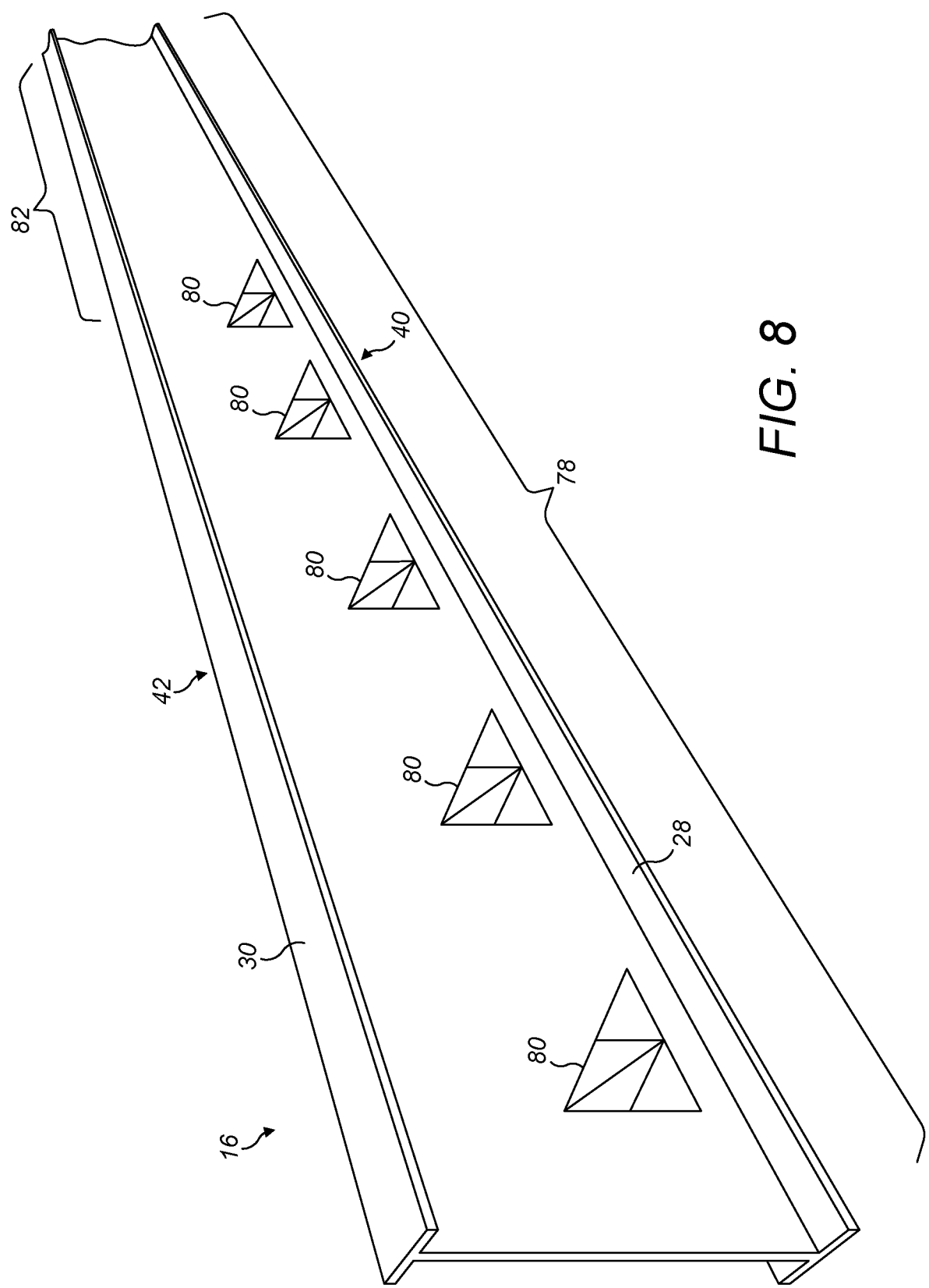
FIG. 8 shows an outboard part of the shear web fitted with a plurality of additional stabilisers designed to remain permanently attached to the shear web.

Referring to FIG. 8, this shows an outboard portion 78 of the shear web 16 according to a further embodiment of the invention. In this embodiment, as shown schematically, further stabilisers 80 are provided on the shear web 16 in this outboard portion. The stabilisers 80 serve to add further stability to the shear web 16 in this outboard portion 78 during the join-up process. The stabilisers in the embodiment of FIG. 8 have a triangular shape.

Due to the tapering height of the blade 10 towards its tip 20 (shown in FIG. 1), the outboard portion 78 of the shear web 16 cannot be accessed by personnel after the join-up process because space is too limited inside the blade 10. Therefore, the stabilisers 80 provided on this outboard portion 78 of the shear web 16 are designed to remain permanently attached to the shear web 16, in contrast to the removable stabilisers 36 described previously. Accordingly, these stabilisers 80 remain inside the blade 10 for the operating life of the blade 10. As such, it is preferred that relatively lightweight and low-cost materials are used to construct the stabilisers 80 so that they do not add considerably to the overall weight of the blade 10.

The stabilisers 80 are preferably formed from plastics materials or composite materials, e.g. fibre-reinforced composites such as GRP or CFRP. The stabilisers 80 may be formed by injection moulding or plastic stamping, for example, resulting in relatively low-cost parts. The stabilisers 80 may be bonded or otherwise fastened to the shear web 16. As with the removable stabilisers 36 discussed previously, the permanently-attached stabilisers 80 are also designed to be compliant, in that they allow the shear web 16 to move vertically during the join-up process to ensure adequate consolidation of the bond lines 72, 74 between the shear web 16 and blade shells 12, 14. To this end, these stabilisers 80 may also include compressible feet (not shown in FIG. 8), similar to those discussed previously, such as compressible foam feet, e.g. made of neoprene. The compliance may be provided by other means, for example the stabilisers 80 may be deformable.

As with the previous embodiment, the stabilisers 80 are preferably provided on both sides 40, 42 of the shear web 16. The stabilisers 80 on one side of the shear web 16 may be longitudinally aligned with stabilisers 80 on the other side of the shear web 16. Alternatively, the stabilisers 80 may be offset from one another, i.e. in staggered relation.

In this embodiment, no stabilisers are provided in a tip-end portion 82 of the shear web 16, since the shear web 16 is relatively short in this portion due to its taper and the lower-mounting flange 28 may provide sufficient stability for this end of the web 16.

Whilst the permanently-attached stabilisers 80 increase the stability of the shear web 16 in the outboard portion 78, this comes at the cost of increasing the overall weight of the blade. This is minimised by the use of lightweight materials. As these stabilisers 80 remain in the blade 10 permanently, this also adds to the overall cost of the blade 10.

An alternative solution for stabilising the shear web 16 that avoids some of these disadvantages, will now be described with reference to FIGS. 9 and 10.

Figure 9:
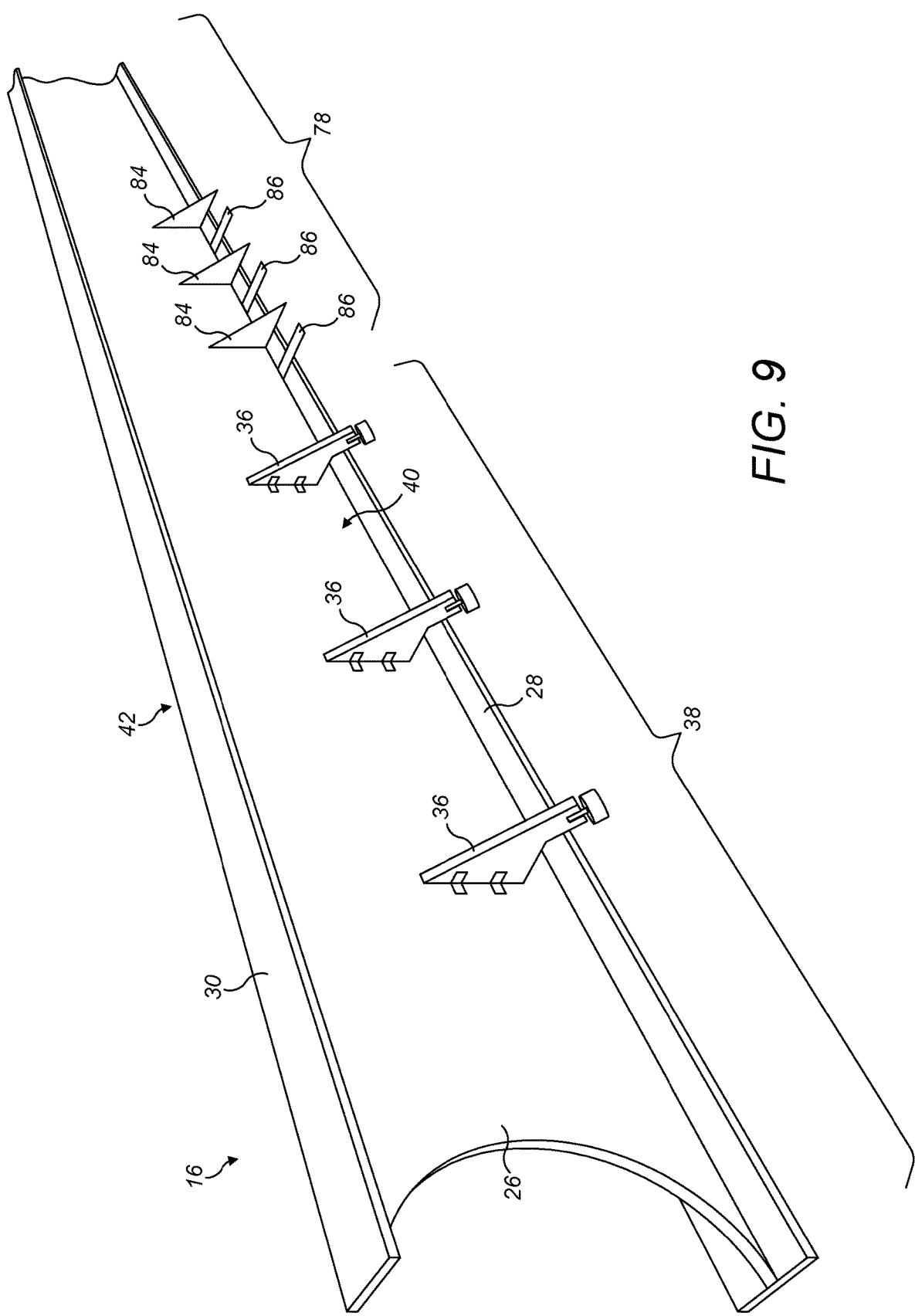
FIG. 9 is a perspective view of the shear web corresponding to FIG. 2 and additionally showing a plurality of temporary stabilisers and tabs attached to an outboard part of the shear web.
Figure 10:
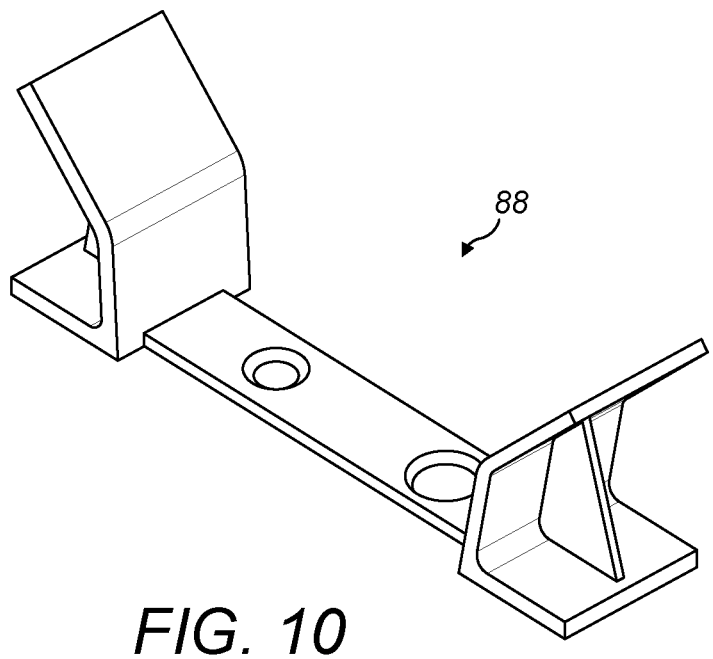
FIG. 10 shows a web foot locator for locating the shear web relative to the half shells.

Referring to FIG. 9, this figure shows a shear web 16 provided with a first plurality of removable stabilisers 36 in an inboard portion 38 (similar to the shear web in FIG. 2), and an optional second plurality of removable stabilisers 84 in an outboard portion 78. A plurality of tabs 86 are also provided in the outboard portion 78 of the shear web 16. The tabs 86 are designed to be bonded to the inner surface 32 of the first half shell 12. The tabs 86 serve to stabilise the outer portion 78 of the shear web 16 during the join-up process and provide a lower-cost and lower-weight alternative to the permanently-attached stabilisers 80 of the previous embodiment.

The tabs 86 extend outwards from the web 16, generally perpendicular to the plane of the web panel 26. The tabs 86 may be bonded or otherwise attached to the shear web 16. In this example, the tabs 86 are bonded to the lower mounting flange 28. Three tabs are provided on each side 40, 42 of the shear web 16 in this example, although any number of tabs 86 may be used in other embodiments. The tabs 86 are preferably made from GRP, although other suitable materials may be used, e.g. CFRP. In this example, the tabs 86 comprise generally flat strips, but in other embodiments the tabs 86 may be moulded to fit the geometry of the blade shell 12.

After the shear web 16 is lifted into the first half shell 12 (as discussed previously in relation to FIG. 4), the tabs 86 are bonded to the inner surface 32 of the half shell 12. The optional second plurality of stabilisers 84 is provided to stabilise this outboard portion 78 of the shear web 16 during this process. However, once the adhesive has cured to bond the tabs 86 to the inner surface 32 of the first half shell 12, these stabilisers 84 can then be removed prior to the join-up process. In other examples, it may not be necessary to use the second plurality of stabilisers 84, for example if the inboard stabilisers 36 provide adequate stability for the shear web 16, or other means of stabilising the shear web 16 may be used whilst the tabs 86 are bonded to the blade shell 12.

As the tabs 86 are provided in the outboard portion 78 of the shear web 16, they cannot be accessed after the join-up process, and so must remain in place inside the blade 10 for the service life of the blade 10. However, these tabs 86 add little in the way of cost and weight to the overall blade 10, and as such provide advantages over the permanently-attached stabilisers 80 of the previous embodiment.

A fast curing adhesive may be used to bond the tabs 86 to the blade shell 12. This is desirable because the adhesive must be cured before the second plurality of stabilisers 84 can be removed, i.e. before the join-up process can commence. However, it will be appreciated that the adhesive 56 between the lower mounting flange 28 and the lower half shell 12 will already have been deposited at this time, and so the fast-cure adhesive should be capable of curing before this adhesive. Fast-curing adhesives having a cure time in the range of approximately 5-10 minutes are preferred. Examples include fast-cure epoxy or polyurethane adhesives.

As mentioned previously, it is important to ensure precise positioning of the shear web 16 relative to the blade shells 12, 14. Precise chordwise positioning of the shear web 16 may be achieved using web foot locators 88, as shown in FIG. 10. A plurality of web foot locators 88 may be bonded to the inner surfaces 32, 34 of both half shells 12, 14.

Figure 11:
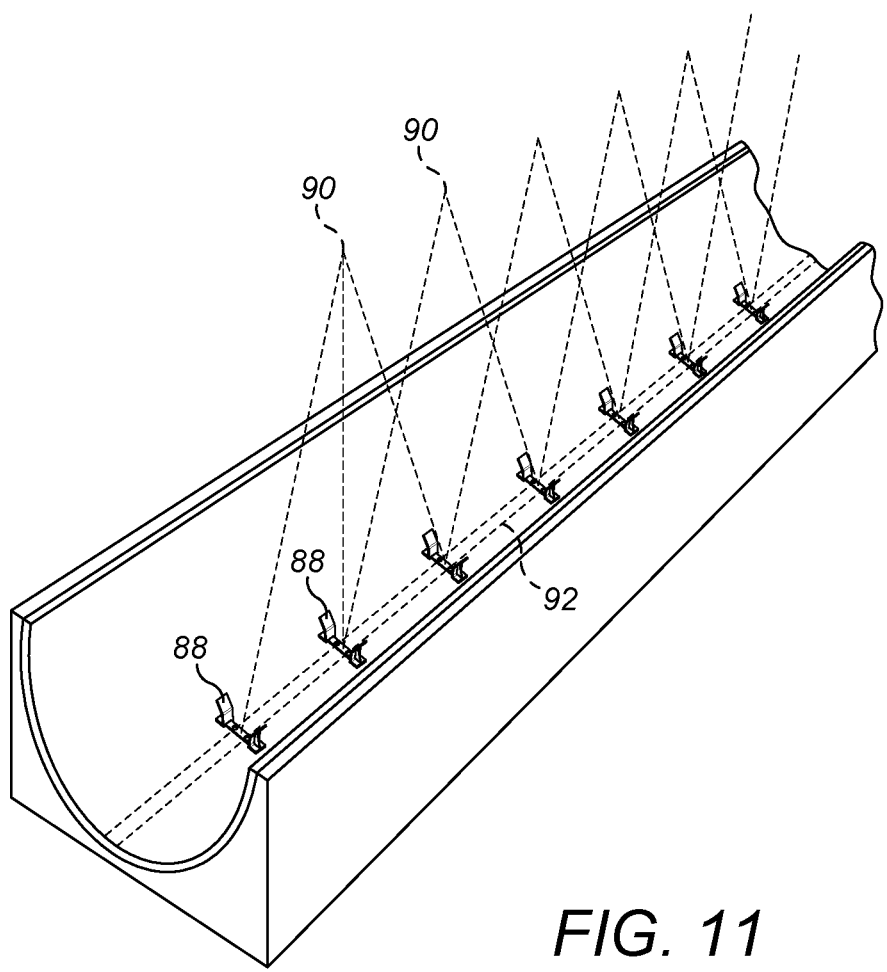
FIG. 11 shows a plurality of web foot locators being positioned on an inner surface of the first half shell with laser-positioning used to indicate the required locations for the web foot locators.

Referring to FIG. 11, laser projection 90 may be used to indicate the correct locations for the web foot locators 88 on the half shells 12, 14. In this example, the web foot locators 88 are evenly spaced in a straight line along the shear web bond line region 92, where the adhesive 56 (shown in FIG. 3) is to be applied to the first half shell 12. Further details of the web foot locators 88 may be found in applicant's co-pending patent application PCT/DK2016/050393, the contents of which is hereby incorporated by reference.

In addition to ensuring chordwise positioning of the shear web 16, the web foot locators 88 may also provide additional support for the shear web 16, as will now be described with reference to FIG. 12.

Figure 12:
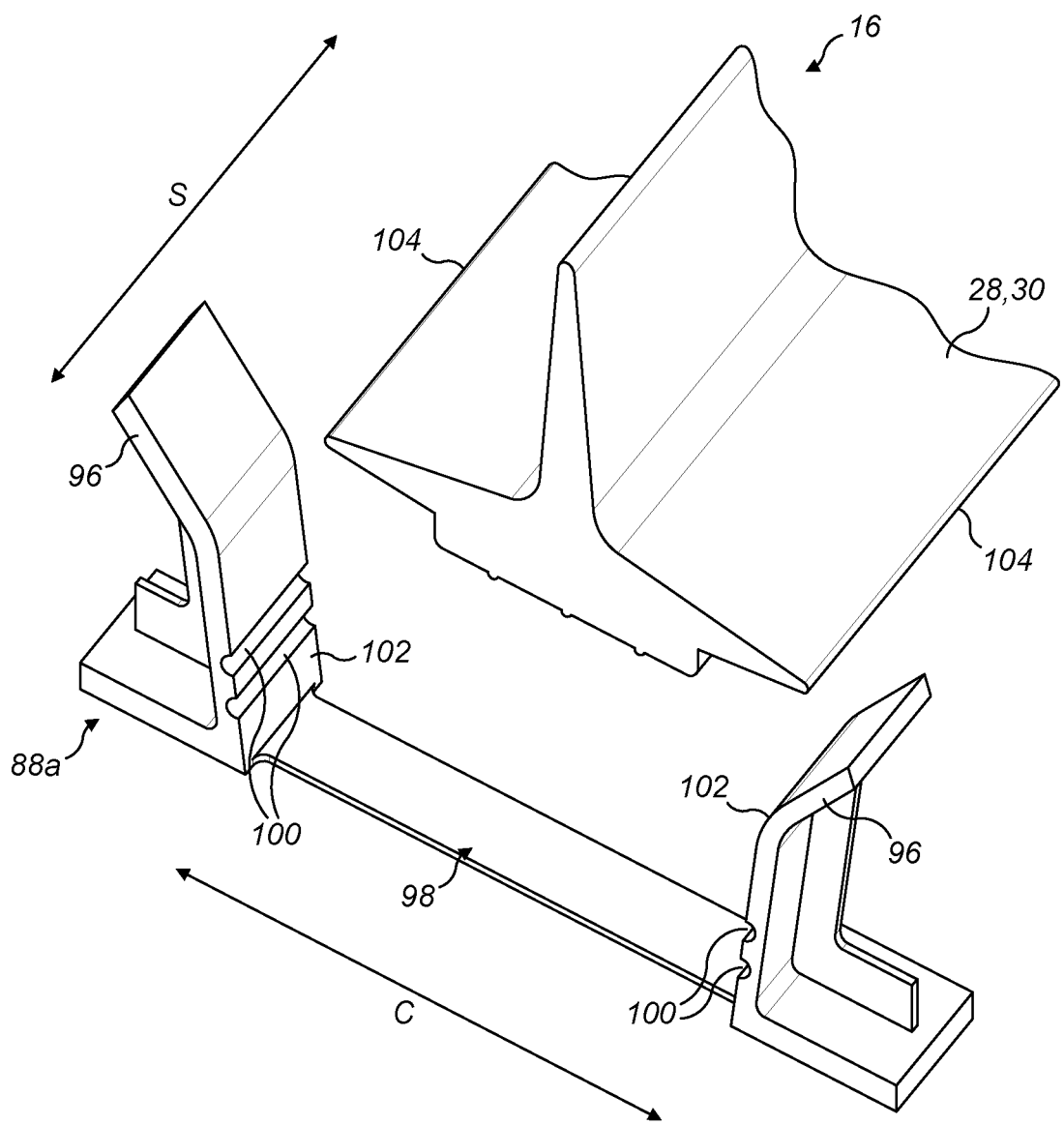
FIG. 12 shows a modified web foot locator having snap fit features for engaging edges of a mounting flange of the shear web.

FIG. 12 shows a modified web foot locator 88a, which is configured to form an interlock with the mounting flange 28, 30 of the shear web 16. The web foot locator 88a comprises a pair of upstands 96, which are spaced apart in the chordwise direction C of the blade to define an intermediate space 98 therebetween that receives the shear web mounting flange 28, 30. The upstands 96 are configured to guide the shear web 16 towards the intermediate space 98.

The web foot locator 88a includes snap-fit features 100 configured to form a snap-fit interlock with the mounting flange 28, 30 of the shear web 16. Specifically, each upstand 96 includes a plurality of grooves 100. The grooves 100 extend longitudinally in the spanwise direction S. The grooves 100 are spaced apart vertically, perpendicular to the spanwise direction S and the chordwise directions C. The grooves 100 are provided on inner surfaces 102 of the upstands 96, such that the grooves 100 on one upstand 96 are mutually opposed with the grooves 100 on the other upstand 96.

When the shear web 16 is inserted between the upstands 96 of the web foot locator 88a, the longitudinal edges 104 of the mounting flange 28, 30 engage with a pair of opposed grooves 100 and form a snap fit. Whilst not shown in FIG. 12 for clarity, the adhesive 56 or 60 (shown in FIGS. 3 and 5) for bonding the shear web 16 to the blade shells 12, 14 may be located in the intermediate space 98 of the web foot locator 88a. As the shear web 16 is forced closer towards the blade shells 12, 14 during the join up, this adhesive 56, 60 is compressed and the shear web 16 may be forced into the next set of grooves 100 in the series. Optionally, the grooves 100 may define a toothed ratchet mechanism, based on similar principles to a cable tie, to prevent movement of the shear web 16 in the reverse direction.

The snap fit features 94 provide additional stability for the shear web 16 and further serve to maintain the shear web 16 vertically and prevent it from tilting during the join-up process. In a particular embodiment, the web foot locators 88a with snap fit features may be provided in outboard portions of the blade shells 12, 14, and arranged to engage the outboard portion 78 (see FIG. 9) of the shear web 16. This is particularly effective for stabilising the shear web 16 in the outboard portion 78. The removable stabilisers 36 described previously may be used on the inboard portion 38 (see FIG. 9) of the shear web 16. The web foot locators 88a with snap fit features may be used instead of, or in combination with, the permanently-attached stabilisers 80 (see FIG. 8) or bonded tabs 86 (see FIG. 9) for stabilising the outboard portion 78 of the shear web 16.

Figure 13:
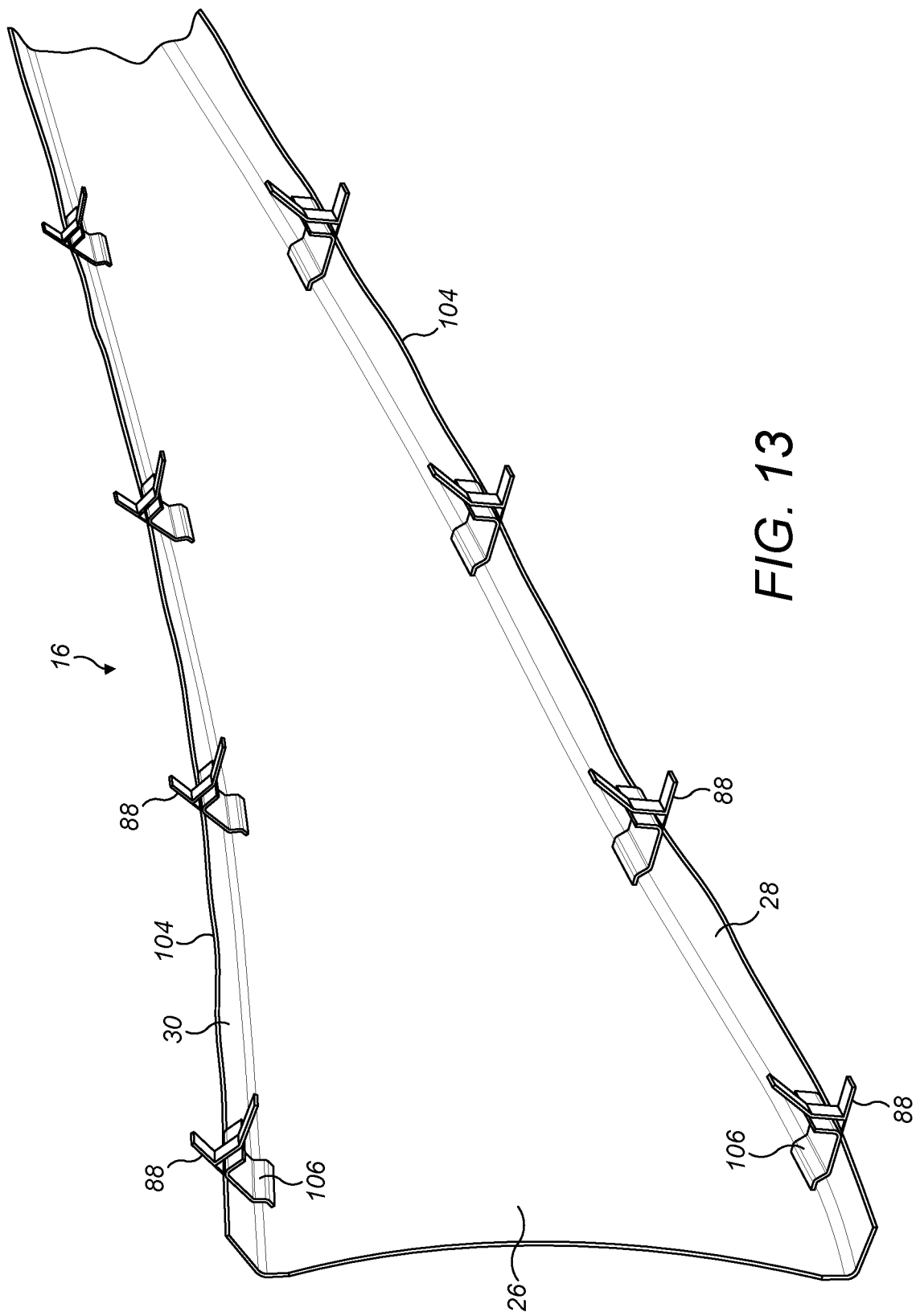
FIG. 13 shows a variant of the shear web having a C-shaped cross-section.
Figure 14:
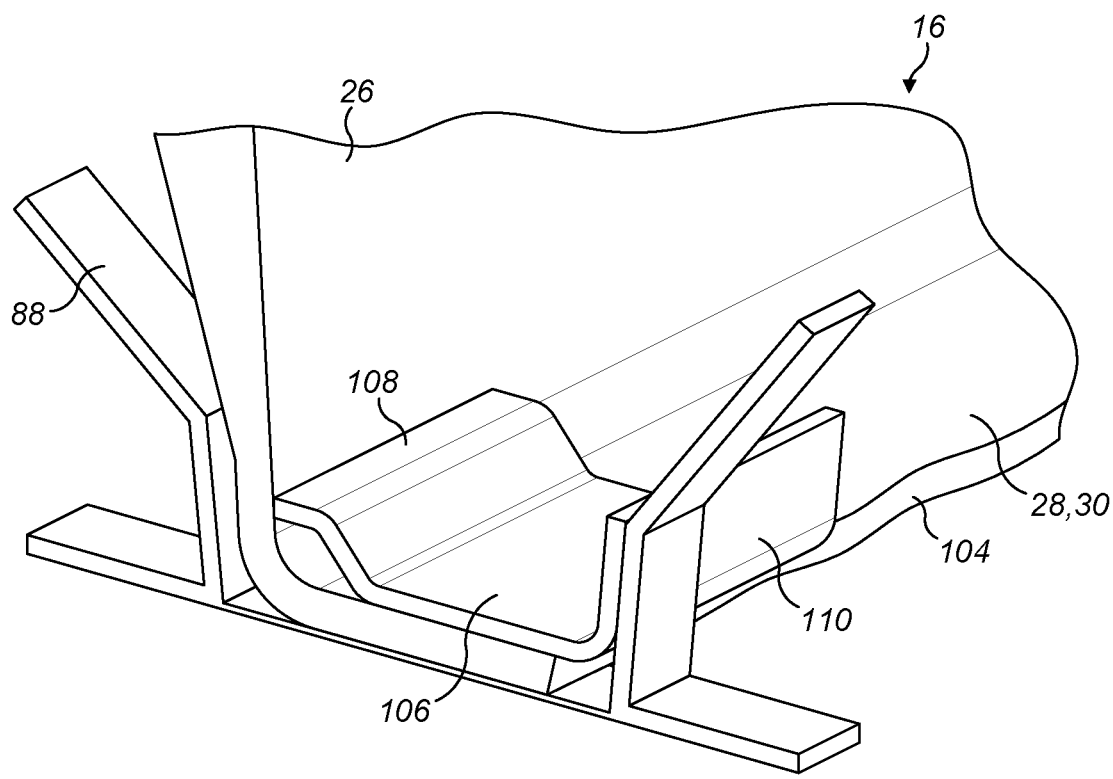
FIG. 14 is a close-up view of part of a mounting flange of the C-shaped shear web fitted with a flange extender for providing accurate location in the web foot locator.

As well as being suitable for shear webs 16 having an I-shaped cross section, the web foot locators 88, 88a may also be used in conjunction with shear webs having a C-shaped cross section. A C-shaped shear web 16 is shown in FIG. 13. Due to the moulding techniques used to create C-shaped webs, which the skilled person will be familiar with, the mounting flanges 28, 30 of the C-shaped web 16 tend to have roughly trimmed edges 104. These flanges 28, 30 therefore do not have consistent or accurately-defined dimensions, and therefore cannot be used as datums for positioning the shear web 16.

To overcome this, flange extenders 106 may be provided on the shear web 16. Referring also to the close-up view of FIG. 14, the flange extenders 106 may be bonded to the mounting flanges 28, 30 of the shear web 16. The flange extenders 106 are wider than the trimmed flange 28, 30 and have accurate dimensions. A first end 108 of the flange extender 106 is configured to make contact with the shear web panel 26, whilst a second end 110 of the flange extender 106 projects beyond the trimmed edge 104 of the mounting flange 28, 30. The second end 110 provides an accurate reference surface for engaging with the web-foot locator 88. The second end 110 may comprise a moulded return flange, as shown, to achieve 'cup and cone' location with the web foot locator 88. If required, snap fit features may be provided between the flange extender 106 and the web foot locater 88. Alternatively, or additionally, the flange extender 106 may be fastened to the web foot locator 88 by a suitable fastener.

The stabilisers 36, 80 and other stability-enhancing devices 86, 88, 88a discussed above can be used to support the shear web 16 during a one-stage join-up process. These devices therefore allow a one-stage join up to be performed successfully without the need for a complicated jig to be used to support the shear web 16. Accordingly, the solutions described above significantly reduce the cost and complexity of blade manufacture and do not suffer from long lead times associated with manufacturing and installing jigs. In contrast to jigs, which typically extend outside the mould and may attach to flanges 112 (see FIG. 4) of the mould or to the factory floor, the stabilisers 36, 80 described above may be contained entirely within the mould cavity and do not extend outside or beyond the longitudinal edges 114 (see FIG. 4) of the mould. Significant factory floor space is therefore also made available when shear web jigs are not required. The stabilisers 36, 80 may also be used across multiple different wind turbine blades of different sizes and shapes. The stabilisers 36, 80 therefore provide a more versatile solution to jigs, which are bespoke for a particular blade.

However, as well as stabilising and supporting the shear web 16, shear web jigs presently used in two-stage join ups also allow precise control over the thickness and quality of the bond line 56 (indicated in FIG. 7b) between the shear web 16 and the first half shell 12. A one-stage join up without a jig therefore presents additional challenges relating to controlling the thickness and quality of the bond lines 72, 74 between the shear web 16 and the blade shells 12, 14.

These challenges may be addressed by the provision of the bond spacers 58a, 58b, mentioned previously in the discussion relating to FIGS. 3 and 5. The bond spacers 58a, 58b may optionally be provided in the adhesive 56, 60 between the shear web 16 and the blade shells 12, 14. The bond spacers 58a, 58b provide a number of advantages during a one-stage join up process including improved control over the thickness and quality of the bond lines 72, 74 (shown in FIG. 7b) between the shear web 16 and the blade shells 12, 14. The form and function of the bond spacers 58a, 58b will now be described in further detail with reference to the remaining figures.

Figure 15:
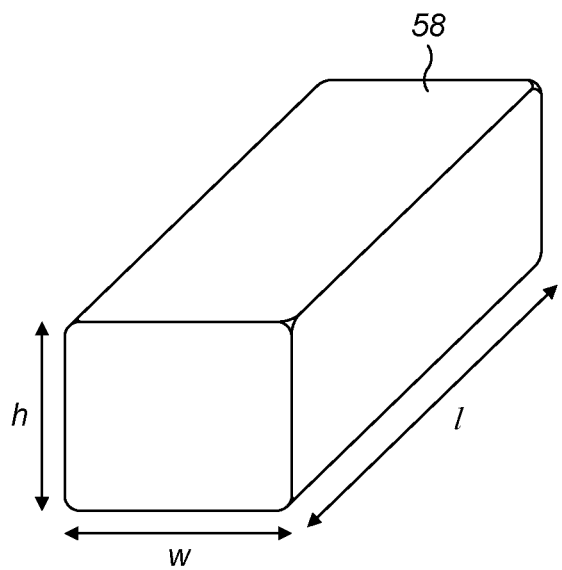
FIG. 15 shows a bond spacer for inclusion in the bond lines between the shear web and the half shells.

FIG. 15 is a perspective view showing an example of a bond spacer 58. The bond spacer 58 may comprise a block made of compressible material. In this example, the bond spacer 58 is made from foam. The bond spacer 58 may have any suitable dimensions, but in this example the block has a lengthwise dimension (I) of approximately 60 mm, a widthwise dimension (w) of approximately 15 mm, and a height dimension (h) (also referred to as 'thickness') of approximately 12 mm.

Preferably the height/thickness (h) of the bond spacers 58 is greater than the thickness of cured adhesive 56, 60 (see FIG. 7b) required in the bond lines 72, 74 between the shear web 16 and the blade shells 12, 14. In this way, the bond spacers 58 prevent over compression of the adhesive 56, 60. As described in more detail later, the bond spacers 58 are designed to undergo plastic deformation when they are subjected to loads above a predetermined amount.

In an example, the bond spacer 58 is made from closed-cell polyethylene terephthalate (PET) material. In this example, this has a compression modulus of 60 MPa and a compression strength of 1.5 MPa. When the bond spacers 58 are subjected to a compressive load they will undergo elastic deformation until a yield point is reached, after which the material will experience plastic deformation and any change in shape of the bond spacers 58 will be irreversible. At the yield point, the yield strength of the material in this example is 1.2 MPa. The yield strength is defined using the offset yield strength method at 0.2% strain.

Referring again to FIG. 3, as mentioned previously, a first plurality of 'lower' bond spacers 58a are positioned in the line of adhesive 56 applied to the inner surface 32 of the first half shell 12. The bond spacers 58a correspond to the bond spacer 58 shown schematically in FIG. 15. The bond spacers 58a are mutually spaced apart in the longitudinal or span-wise direction S. Preferably, the bond spacers 58a are spaced at regular longitudinal intervals along the line of adhesive 56. In this example, the bond spacers 58a are arranged approximately every one metre, although other suitable spacing may be used. In this example, the bond spacers 58a are oriented with their lengthwise dimension (I) substantially parallel to the chordwise direction C of the half shell 12, and their widthwise dimension (w) substantially parallel to the longitudinal direction S of the half shell 12.

The bond spacers 58a may be positioned in the adhesive 56 by hand, for example, after the adhesive 56 has been deposited. Alternatively, the bond spacers 58a may be prepositioned, for example bonded to the inner surface 32 of the first half shell 12, and the line of adhesive 56 may be deposited on top of the bond spacers 58a. As a further alternative, the bond spacers 58a may be attached to the lower mounting flange 28 of the shear web 16.

Referring again to FIG. 5, a second plurality of 'upper' bond spacers 58b have been inserted into the adhesive 60 applied to the upper mounting flange 30 of the shear web 16. The second bond spacers 58b are identical to the first bond spacers 58a in this example. The bond spacers 58b are mutually spaced apart. Preferably, the bond spacers 58b are spaced at regular intervals along the upper mounting flange 30. In this example, the bond spacers 58b are arranged approximately every one metre, although other suitable spacing may be used. In this example, the bond spacers 58b are oriented with their lengthwise dimension (I) substantially parallel to the width of the upper mounting flange 30, and their widthwise dimension (w) substantially parallel to the length of the upper mounting flange 30.

The bond spacers 58b may be positioned in the adhesive 60 by hand, for example, after the adhesive 60 has been applied to the upper mounting flange 30. Alternatively, the bond spacers 58b may be prepositioned, for example bonded to the upper mounting flange 30, and the line of adhesive 60 may be deposited on top. As a further alternative, the upper bond spacers 58b may be attached to the inner surface 34 of the second half shell 14.

Preferably the bond spacers are positioned such that the lower and upper bond spacers 58a, 58b are mutually aligned.

The bond spacers 58a, 58b are positioned in the adhesive 56, 60 and therefore they interrupt the lines of adhesive 56, 60 at intervals. The widthwise dimension (w) of the bond spacers 58a cannot be so large that it would have a detrimental effect on the strength of the adhesive bond lines 72, 74 (shown in FIG. 7b).

Figure 16A:
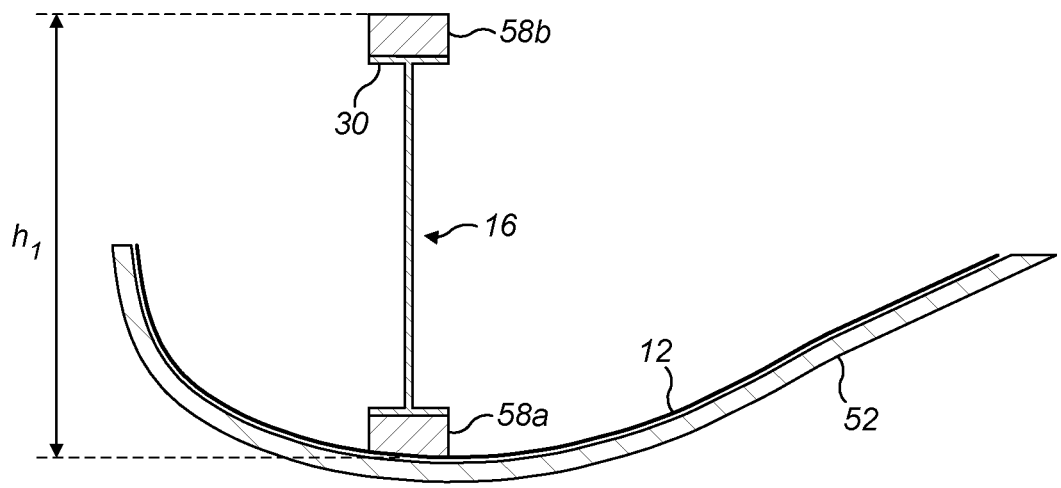
FIGS. 16a-16d are schematic cross-sectional views through a blade and mould assembly showing the function of the bond spacers during a one-stage blade join-up process.

Referring to FIG. 16a, this is a schematic cross-sectional view of the first or 'lower' mould half 52 supporting the first or 'lower' half shell 12. The shear web 16 is arranged in the first half shell 12 and is shown supported on top of the first 'lower' bond spacers 58a. As discussed above in relation to FIG. 5, second 'upper' bond spacers 58b are provided on the upper mounting flange 30 of the shear web 16. The mass of the shear web 16 is lower than the yield strength of the lower bond spacers 58a. Accordingly, no plastic deformation of the lower bond spacers 58a occurs at this stage.

Figure 16B:
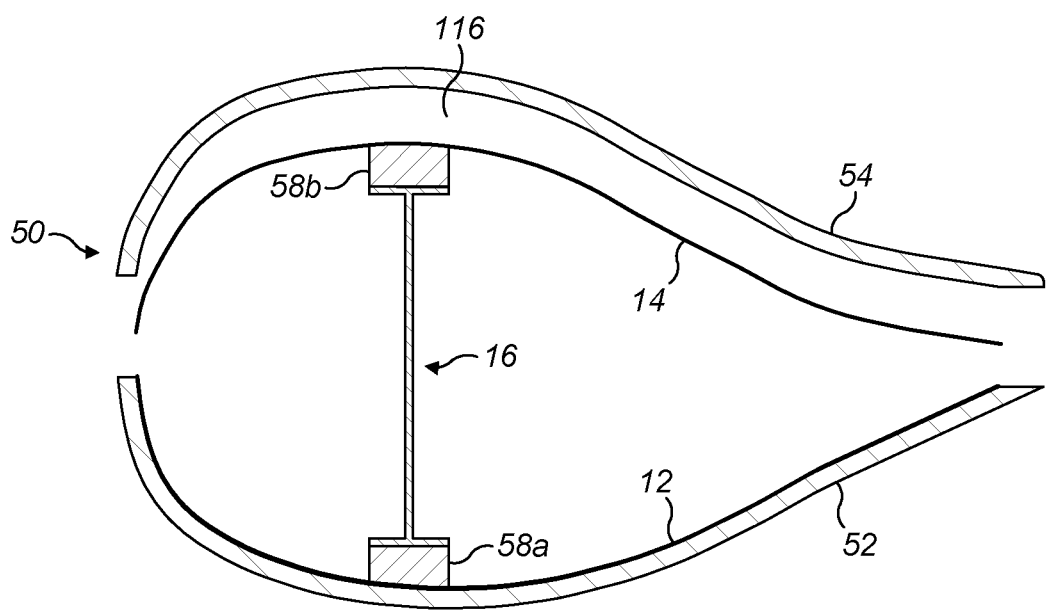

Referring to FIG. 16b, the mould assembly 50 is closed by lowering the second or 'upper' mould half 54 onto the lower mould half 52. As shown in FIG. 16b, the second or 'upper' half shell 14 may release partially or completely from the upper half mould 54 when the mould 54 is turned upside down, resulting in a gap 116 between the upper half shell 14 and the upper mould half 54, as shown. It should be noted that the gap 116 is not to scale and in reality would be smaller.

If the upper half shell 114 releases from the upper mould half 54 then it is advantageously supported by the upper bond spacers 58b. The mass of the upper shell 14 is less than the yield strength of the upper bond spacers 58b, and the upper bond spacers 58b hold the shell 14 up until the upper mould 54 makes contact with the shell 14 again.

If bond spacers 54a, 54b were not present, then the released parts of the second half shell 14 may cause localised over compression of the adhesive 56, 60 (see FIG. 7) above or below the shear web 16 and/or uneven compression of the adhesive 56, 60 during the join-up, which may result in bond lines 72, 74 (see FIG. 7b) of insufficient thickness, and potentially may cause dis-bonds. The bond spacers 58a, 58b are thicker than the thickness of cured adhesive 56, 60 required in the bond lines 72, 74, which prevents the adhesive 56, 60 from becoming over compressed if the upper half shell 14 releases from the upper mould half 54.

Figure 16C:
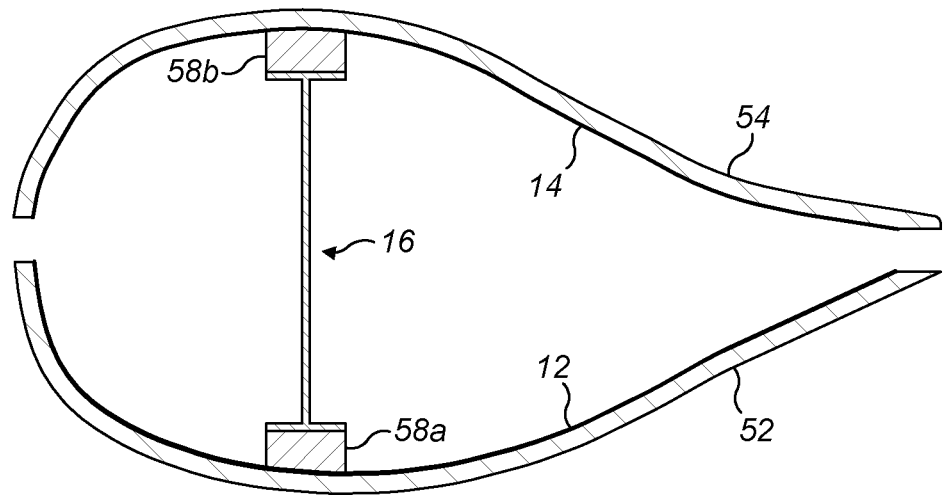

Referring to FIG. 16c, the upper mould half 54 is lowered further and makes contact again with the upper half shell 14. The upper bond spacers 58b force the upper half shell 14 back into the upper mould half 54 before substantial compression of the adhesive 56, 60 in the bond lines 72, 74 (shown in FIG. 7b) takes place. The mass of the mould 54 now also acts on the bond spacers 58a, 58b. The combined load of the upper mould half 54 and the upper half shell 14 acting on the bond spacers 58a, 58b exceeds the yield strength of the bond spacers 58a, 58b. The bond spacers 58a, 58b therefore begin to undergo plastic deformation. As the bond spacers 58a, 58b push the upper shell 14 firmly into its mould 54, the adhesive in the bond lines is compressed evenly along the length of the shear web 16.

If bond spacers 58a, 58b were not present, then any gaps 116 (see FIG. 16b) formed by release of the second half shell 14 from its mould half 54 may remain during compression of the adhesive 56, 60 (shown in FIG. 7b). When heat is subsequently applied to cure the adhesive 56, 60, thermal expansion in the assembly may then cause the second half shell 14 to lift back up into the second mould half 54 and cause a dis-bond in the upper bond line 74 (shown in FIG. 7b). The use of the bond spacers 58a, 58b ensures that the second half shell 14 is pressed firmly into its mould half 54 eliminating gaps 116 (see FIG. 16b) and therefore avoiding the possibility of dis-bonds occurring in this way.

Figure 16D:
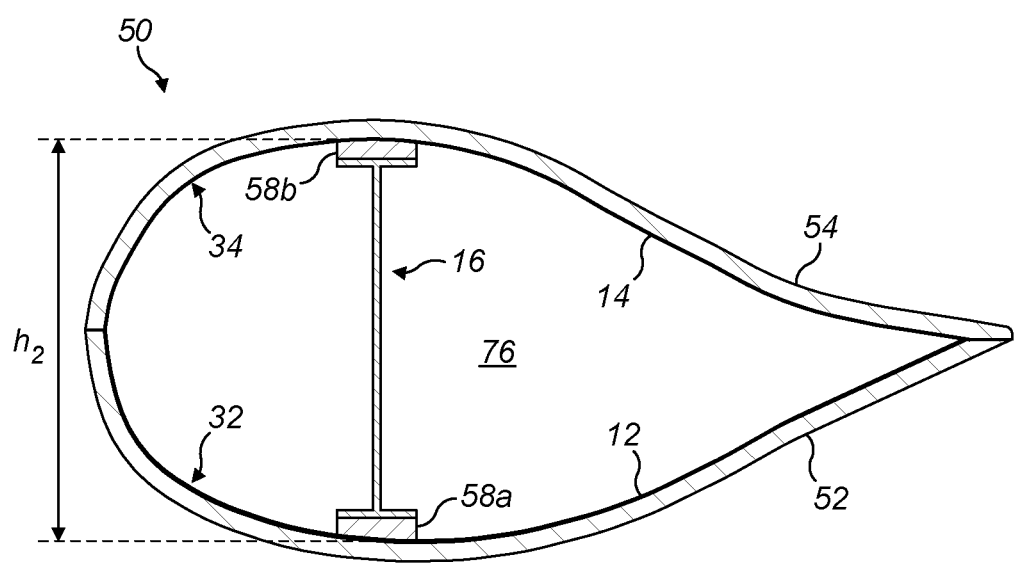

Referring to FIG. 16d, the upper mould half 54 is lowered further to bring the first and second half shells 12, 14 together. The bond spacers 58a, 58b continue to compress until end stops on the mould 50 are reached. With the upper half shell 14 firmly pushed up into the upper half mould 54, the compressive stress on the upper and lower bond spacers 58a, 58b is the same. It also follows that the compression of the adhesive 56, 60 in the bond lines 72, 74 (shown in FIG. 7b) above and below the shear web 16 is equal. This results in the shear web 16 being centralised between the lower and upper half shells 12, 14.

The thickness of the compressed adhesive 56, 60 in the lower and upper bond lines 72, 74 (shown in FIG. 7b) is therefore also equal, resulting in ideal bonding between the shear web 16 and both blade shells 12, 14. Heat may now be applied to cure the adhesive 56, 60. With the upper half shell 14 pushed firmly into the upper mould half 54, gaps between the upper half shell 14 and the upper half mould 54 are substantially eliminated and hence the upper half shell 14 cannot lift up and cause a dis-bond during the curing process.

It will be appreciated from FIGS. 16a-16d that the combined height ($h_1$) of the shear web 16 and bond spacers 58a, 58b prior to closing the mould 50 (see FIG. 16a) is greater than the height ($h_2$) of the internal cavity 76 defined between the inner surfaces 32, 34 of the first and second half shells 12, 14 in the completed blade (see FIG. 16d).

The bond spacers 58a, 58b compress under the weight of the second half shell 14 and second half mould 54 and undergo plastic deformation (as shown in FIG. 16d) such that the combined height of the shear web 16 and the compressed bond spacers 58a, 58b is equal to the height ($h_2$) of the internal cavity 58 in the finished blade.

The use of bond spacers 58a, 58b presents a number of advantages when used in a one-stage join up. In summary, the bond spacers 58a, 58b ensure that the second half shell 14 is pushed firmly into the second half mould 54 before substantial compression of the adhesive 56, 60 takes place. This avoids gaps 116 (see FIG. 16b) between the shell 14 and mould 54 during the cure process, and thus prevents the possibility of the upper half shell 14 lifting and causing a dis-bond. More generally, the bond spacers 58a, 58b serve to prevent movement between the shell 12, 14 and the web 16 during the bonding process. With the second half shell 14 firmly seated in its mould 54, even compression of the adhesive 56, 60 is achieved along the length of the shear web 16. This avoids over compression of adhesive 56, 60, which could also cause dis-bonds. Furthermore, when used in a one-stage join up, the bond spacers 58a, 58b serve to centralise the shear web 16 between the first and second half shells 12, 14, resulting in substantially equal compression of adhesive 56, 60 on both sides of the shear web 16, and hence bond lines 72, 74 of substantially equal thickness.

The bond spacers 58a, 58b described above have material properties such that when they are compressed under sufficient load, they maintain their deformed shape (i.e. they undergo plastic deformation). If the spacers 58a, 58b did not maintain their compressed shape (e.g. if they only underwent elastic deformation) then they may act as springs between the web 16 and the shells 12, 14 and could push the web flange 28, 30 away from the shell 12, 14 and cause dis-bonds in the adhesive 56, 60. The use of bond spacers 58a, 58b which undergo plastic deformation therefore avoids the possibility of the spacer blocks 58a, 58b themselves causing dis-bonds in the bond lines 72, 74 between the shear web 16 and the half shells 12, 14. The bond spacers 58a, 58b are also relatively lightweight and therefore do not add appreciable weight to the blade 10.

As noted above, a plurality of bond spacers 58 are used along the length of the shear web 16, on the upper and lower sides. When the above description refers to the mass of the upper mould half 54 and upper half shell 14 exceeding the yield strength of the bond spacers 58a, 58b, it should be appreciated that that the mass of the mould half 54 will be distributed among the plurality of bond spacers 58a, 58b.

The compression modulus and the yield strength of the material of the bond spacers 58a, 58b are carefully chosen. If the material is too stiff (a high compression modulus) then the bond spacers 58a, 58b would not sufficiently compress and may cause damage to the web flanges 28, 30 and/or the half shells 12, 14 or even the mould halves 52, 54. For example, if the bond spacer material has a high compressive modulus the bond spacer 58a, 58b would not be compressed when the upper half shell 14 and upper mould half 54 bear against the bond spacer 58a, 58b. This could cause the web 16 to buckle, or the shells 12, 14 to be damaged, or the mould half 52, 54 to be damaged.

The number of upper bond spacers 58b that are used is linked to the stiffness of the upper half shell 14 and the weight of the upper half shell 14. The upper half shell 14 will tend to hang (i.e. sag) between the bond spacers 58b, that is it will adopt a wave-like shape in a spanwise direction S (shown in FIG. 1). Therefore, a second half shell 14 having a relatively low stiffness will require bond spacers 58b at closer intervals than a second half shell 14 having a relatively high stiffness. The number of upper bond spacers 58b that are used is also linked to the maximum allowable size of the spacers 58b because the spacers 58b cannot be so large that they would have a negative impact on the bond line 50, and the maximum allowable point load on the upper mould half 54.

In an example, from the stiffness of the upper blade shell 14 it is determined that bond spacers 58b should be placed at intervals of three meters. A bond spacer 58b will then be subjected to the weight of the upper shell half 14 and the upper mould half 54 for 1.5 meters each side of the bond spacer 58b. Therefore, the bond spacer 58b will be subjected to the weight of a three-meter length of the upper half shell 14 and upper mould half 54. If the weight of this three-meter length of upper half shell 14 and upper mould half 54 is 1500N (by way of example only) then the material and the dimensions of the bond spacer 58b are selected such that the compressive yield strength of the bond spacer is 1500N or less. In addition, the compressive failure strength of the bond spacer 58b must be greater than 1500N.

These same principles apply when selecting the number, spacing and materials for the first (lower) bond spacers 58a. Preferably the first bond spacers 58a are identical to the second bond spacers 58b.

By way of non-limiting summary, a method of making a wind turbine blade 10 has been described. The wind turbine blade comprises first and second half shells 12, 14 joined together and a shear web 16 bonded between inner surfaces 32, 34 of the respective half shells 12, 14. The blade 10 is made in a one-stage join up process, which involves supporting the half shells 12, 14 in respective mould halves 52, 54, and arranging one of the half shells on top of the other half shell with the shear web 16 arranged between the two half shells 12, 14. Adhesive 56, 60 is provided between the shear web 16 and the inner surfaces 32, 34 of the respective half shells 12, 14. During the join-up process, the shear web 16 may be supported by stabilisers 36, 80. The use of stabilisers avoids the need for a jig to support the shear web 16. Stabilisers 36 attached to an inboard end 38 of the shear web 16 may remain accessible after the join-up and can be removed.

Many modifications may be made to the above examples without departing from the scope of the present invention. For example, whilst the blade 10 in the above examples comprises a single main shear web 16, in other examples the blade 10 may include one or more further shear webs, for example a secondary shear web may be disposed near the trailing edge of the blade 10. This is suitable for blades having a relatively large chord, where additional strength may be required in the trailing edge. The secondary shear web(s) may also be supported using stabilisers, and other supporting structures, in the same way as described above in relation to the primary shear web 16.

The invention is not limited to the form of the stabilisers shown in the figures. The stabilisers may have any suitable form in other embodiments, for example they may comprise frames or bars, e.g. the stabiliser may simply comprise a kinked bar attached at one end to the shear web and having a foot at the other end.

Whilst in the above examples adhesive 56 is applied to the first half shell 12, in other embodiments the adhesive 56 could be applied directly to the lower mounting flange 28 of the shear web 16 instead of to the first half shell 12. The 'lower' bond spacers 58a may alternatively or additionally be applied to the lower mounting flange 28, in a similar way to that described above in relation to the upper mounting flange 30. Also, in other embodiments, the adhesive 60 could be applied to the inner surface 34 of the second half shell 14 instead of to the upper mounting flange 30. The 'upper' bond spacers 58b may alternatively or additionally be applied to the inner surface 34 of the second half shell 14, in a similar way to that described above in relation to lower bond spacers 58a applied to the first half shell 12.

The terms 'upper' and 'lower' are used for convenience in the above description to refer to the various parts in the orientations shown in the figures. These terms are not intended to limit the scope of the invention.

The invention claimed is:

1. A method of making a wind turbine blade, the method comprising:
providing first and second half shells of the blade, each half shell extending in a spanwise direction between a root end and a tip end and extending in a chordwise direction between a leading edge and a trailing edge;
providing a longitudinally-extending shear web comprising a web panel disposed between first and second mounting flanges;
providing adhesive between the first mounting flange of the shear web and the inner surface of the first half shell;
providing adhesive between the second mounting flange of the shear web and the inner surface of the second half shell;
joining the parts together in a one-stage join up process comprising arranging the second half shell on top of the first half shell and joining the half shells together whilst simultaneously curing the adhesive between the shear web and the first and second half shells to bond the shear web to the first and second half shells;
wherein the method further comprises supporting the shear web relative to the first half shell during the one-stage join up process by means of a plurality of stabilisers attached to the shear web, wherein each stabiliser extends from the shear web and has a foot arranged in contact with the inner surface of the half shell at a location spaced in the chordwise direction from the shear web.

2. The method of claim 1, further comprising compressing the feet of the stabilisers under the weight of the second half shell acting on the shear web during the one-stage join up process.

3. The method of claim 1, further comprising setting or adjusting a position of the feet of the stabilisers so that the shear web is supported in a substantially vertical orientation.

4. The method of claim 1, further comprising removing the stabilisers from the shear web after the one-stage join up process.

5. The method of claim 1, wherein the stabilisers are only attached to an inboard portion of the shear web that remains accessible inside the blade following the join-up process.

6. The method of claim 1, further comprising supporting the shear web during the join-up process by means of a plurality of further stabilisers attached to an outboard portion of the shear web, wherein the outboard portion is not accessible inside the blade following the join-up process, and wherein the further stabilisers are not removed following the join-up process.

7. The method of claim 1, further comprising bonding a plurality of tabs between the first mounting flange and the inner surface of the first half shell prior to the join-up process.

8. The method of claim 7, further comprising supporting the shear web by means of temporary stabilisers whilst bonding the plurality of tabs and removing the temporary stabilisers from the shear web prior to the join-up process.

9. The method of claim 1, wherein the first and second half shells are arranged in a longitudinally-extending mould cavity during the join-up process and the stabilisers do not extend outside longitudinal edges of the mould cavity.

10. The method of claim 1, further comprising attaching a plurality of web foot locators to the inner surface of the first and/or second half shell, the web foot locators being configured to receive a mounting flange of the shear web.

11. The method of claim 10, wherein the web foot locators are configured to form an interlock with the mounting flange.

12. The method of claim 1, further comprising providing a plurality of bond spacers between the first mounting flange and the inner surface of the first half shell and/or between the second mounting flange and the inner surface of the second half shell, and compressing the bond spacers during the join-up process such that they undergo plastic deformation.

13. The method of claim 1, further comprising attaching a plurality of flange extenders to the first and/or second mounting flange of the shear web, the flange extenders being configured to locate the shear web in a respective plurality of web foot locators attached to the inner surface of the first and/or second half shells.

14. A wind turbine blade comprising:
first and second half shells joined together and defining an internal cavity between mutually opposed inner surfaces of the first and second half shells;
a longitudinally-extending shear web arranged in the internal cavity, the shear web having a web panel disposed between first and second mounting flanges and defining first and second opposed sides, the first mounting flange being bonded to the inner surface of the first half shell and the second mounting flange being bonded to the inner surface of the second half shell; and
a plurality of stabilisers attached to the first and second sides of the shear web, wherein each stabiliser extends from the shear web and has a foot arranged in contact with the inner surface of the half shell at a location space in the chordwise direction from the shear web.

15. The wind turbine blade of claim 14, wherein the stabilisers are permanently attached to an outboard portion of the shear web that is inaccessible within the internal cavity of the blade.

16. The wind turbine blade of claim 14, further comprising a plurality of removable stabilisers attached to an inboard portion of the shear web that is accessible within the internal cavity of the blade.

17. The wind turbine blade of claim 14, further comprising a plurality of tabs bonded between the first mounting flange and the inner surface of the first half shell.

18. A wind turbine blade comprising:
first and second half shells joined together and defining an internal cavity between mutually opposed inner surfaces of the first and second half shells;
a longitudinally-extending shear web arranged in the internal cavity, the shear web having a web panel disposed between first and second mounting flanges, the first mounting flange being bonded to the inner surface of the first half shell and the second mounting flange being bonded to the inner surface of the second half shell; and
a plurality of stabilisers attached to and extending from the shear web, wherein each stabiliser includes a body and a foot adjustably positionable relative to the body and arranged to be in contact with the inner surface of the half shell at a location spaced in the chordwise direction from the shear web.

* * * * *